(12) United States Patent
Wang et al.

(10) Patent No.: US 11,405,961 B2
(45) Date of Patent: Aug. 2, 2022

(54) WIRELESS COMMUNICATION METHOD AND APPARATUS

(71) Applicant: Huawei Technologies Co., Ltd., Shenzhen (CN)

(72) Inventors: Yafei Wang, Shanghai (CN); Yongzhao Cao, Shanghai (CN); Chi Zhang, Shanghai (CN)

(73) Assignee: Huawei Technologies Co., Ltd., Shenzhe (CN)

( * ) Notice: Subject to any disclaimer, the term of this patent is extended or adjusted under 35 U.S.C. 154(b) by 220 days.

(21) Appl. No.: 16/813,335

(22) Filed: Mar. 9, 2020

(65) Prior Publication Data

US 2020/0214046 A1  Jul. 2, 2020

Related U.S. Application Data

(63) Continuation of application No. PCT/CN2018/104681, filed on Sep. 7, 2018.

(30) Foreign Application Priority Data

Sep. 8, 2017  (CN) .................. 201710806433.X

(51) Int. Cl.
*H04W 74/08* (2009.01)
*H04W 28/26* (2009.01)
(Continued)

(52) U.S. Cl.
CPC ....... *H04W 74/0833* (2013.01); *H04W 28/26* (2013.01); *H04W 72/005* (2013.01);
(Continued)

(58) Field of Classification Search
None
See application file for complete search history.

(56) References Cited

U.S. PATENT DOCUMENTS 9,456,429 B2 * 9/2016 Ouchi ................. H04W 52/146
11,051,262 B2 * 6/2021 Qian ..................... H04L 5/0053
(Continued)

FOREIGN PATENT DOCUMENTS

CN  101431367 A  5/2009
CN  106255213 A  12/2016
(Continued)

OTHER PUBLICATIONS

"RACH configuration and procedure," 3GPP TSG RAN WG1 NR Ad-Hoc#2, Qingdao, P.R. China, R1-1711279, XP051300474, pp. 1-4, 3rd Generation Partnership Project, Valbonne, France (Jun. 27-30, 2017).
(Continued)

*Primary Examiner* — Ayaz R Sheikh
*Assistant Examiner* — Faiyazkhan Ghafoerkhan
(74) *Attorney, Agent, or Firm* — Leydig, Voit & Mayer, Ltd.

(57) ABSTRACT

This application provides a wireless communication method and an apparatus. The method includes: receiving higher layer signaling from a base station; receiving a broadcast message from the base station; and sending a random access preamble to the base station based on a random access configuration, where a time resource available to the random access preamble includes a part or all of a flexible time resource. Therefore, a random access requirement of a cell-edge terminal can be met, and a problem of PRACH coverage limitation can be resolved.

16 Claims, 5 Drawing Sheets

(51) Int. Cl.
　　　H04W 72/00　　　(2009.01)
　　　H04W 72/04　　　(2009.01)
　　　H04W 80/08　　　(2009.01)

(52) U.S. Cl.
　　　CPC ..... *H04W 72/042* (2013.01); *H04W 72/0446* (2013.01); *H04W 80/08* (2013.01)

(56) References Cited

U.S. PATENT DOCUMENTS

| | | | | |
|---|---|---|---|---|
| 2006/0239239 | A1* | 10/2006 | Yang | H04W 74/006 370/342 |
| 2011/0176461 | A1* | 7/2011 | Astely | H04B 7/2656 370/280 |
| 2012/0155338 | A1* | 6/2012 | Noh | H04L 5/0023 370/280 |
| 2012/0287828 | A1* | 11/2012 | Chen | H04L 1/1614 370/280 |
| 2013/0107828 | A1* | 5/2013 | Dinan | H04W 72/042 370/329 |
| 2013/0170376 | A1* | 7/2013 | Dinan | H04L 1/0026 370/252 |
| 2013/0322235 | A1* | 12/2013 | Khoryaev | H04W 24/10 370/229 |
| 2014/0029486 | A1* | 1/2014 | Li | H04B 7/2656 370/280 |
| 2014/0086119 | A1* | 3/2014 | Yang | H04L 1/1861 370/280 |
| 2014/0092823 | A1* | 4/2014 | Song | H04L 5/0073 370/329 |
| 2014/0198675 | A1* | 7/2014 | He | H04L 27/2613 370/252 |
| 2015/0250017 | A1* | 9/2015 | Ingale | H04W 76/28 370/280 |
| 2016/0044672 | A1* | 2/2016 | Quan | H04L 5/0092 370/280 |
| 2016/0080133 | A1* | 3/2016 | Golitschek Edler von Elbwart | H04L 5/1469 370/280 |
| 2016/0150490 | A1* | 5/2016 | Ouchi | H04W 52/58 455/522 |
| 2016/0295526 | A1* | 10/2016 | Park | H04W 52/325 |
| 2017/0367121 | A1* | 12/2017 | Wei | H04L 5/0053 |
| 2018/0242367 | A1* | 8/2018 | Kim | H04W 74/0833 |
| 2020/0154377 | A1* | 5/2020 | Qian | H04W 72/046 |

FOREIGN PATENT DOCUMENTS

| | | |
|---|---|---|
| CN | 106255215 A | 12/2016 |
| CN | 106301738 A | 1/2017 |

OTHER PUBLICATIONS

"3rd Generation Partnership Project; Technical Specification Group Radio Access Network; Evolved Universal Terrestrial Radio Access (E-UTRA); Physical channels and modulation (Release 14)," 3GPP TS 36.211 V14.3.0, pp. 1-195, 3rd Generation Partnership Project, Valbonne, France (Jun. 2017).

"UE behaviors related to SFI," 3GPP TSG RAN WG1 Meeting 90#, Prague, P.R. Czechia, R1-1712851, XP051315663, pp. 1-4, 3rd Generation Partnership Project, Valbonne, France (Aug. 21-25, 2017).

"3rd Generation Partnership Project; Technical Specification Group Radio Access Network; NR; Physical channels and modulation (Release 15)," 3GPP TS 38.211 V1.0.0, pp. 1-37, 3rd Generation Partnership Project, Valbonne, France (Sep. 2017).

"3rd Generation Partnership Project; Technical Specification Group Radio Access Network; NR; Physical layer procedures for control (Release 15)," 3GPP TS 38.213 V1.0.0, pp. 1-16, 3rd Generation Partnership Project, Valbonne, France (Sep. 2017).

"WF on assignment for DL and UL transmission," 3GPP TSG RAN WG1 #89 Meeting, Hangzhou, P.R. China, R1-1709795, pp. 1-3, 3rd Generation Partnership Project, Valbonne, France (May 15-19, 2017).

"Discussion on RACH configuration," 3GPP TSG RAN WG1 Meeting NR Adhoc, Qingdao, China, R1-1710774, Total 3 pages, 3rd Generation Partnership Project, Valbonne, France (Jun. 27-30, 2017).

* cited by examiner

WIRELESS COMMUNICATION METHOD AND APPARATUS

CROSS-REFERENCE TO RELATED APPLICATIONS

This application is a continuation of International Application No. PCT/CN2018/104681, filed on Sep. 7, 2018, which claims priority to Chinese Patent Application No. 201710806433.X, filed on Sep. 8, 2017. The disclosures of the aforementioned applications are hereby incorporated by reference in their entireties.

TECHNICAL FIELD

This application relates to the field of mobile communications technologies, and in particular, to a wireless communication method and an apparatus.

BACKGROUND

In long term evolution (LTE), a first step of a random access process is that a terminal sends a physical layer random access preamble. A main function of a random access preamble is to notify a base station that there is a random access request, so that the terminal can complete uplink access, and the base station can estimate a transmission latency between the base station and the terminal. In this way, the base station calibrates uplink timing, and notifies the terminal of calibration information via a timing advance command.

In LTE, the random access preamble is transmitted on a physical random access channel (PRACH), and the base station notifies, via broadcast system information, e.g. SIB2, all terminals of uplink time-frequency resources on which the random access preamble is allowed to be transmitted. The base station configures configuration information of uplink and downlink time resources via higher layer signaling. The configuration information semi-statically indicates the uplink and downlink time resources, and indicates a time resource, in the uplink time resources, that can be used as a time resource of a PRACH resource to transmit the random access preamble.

In LTE, there is only one type of subcarrier spacing, that is, 15 kHz (kilohertz), and a length of a corresponding time domain resource unit, namely, a length of a subframe, is 1 ms (millisecond). With development of communications technologies, a plurality of types of subcarrier spacings are supported in 5G, for example, 15 kHz, 30 kHz, 60 kHz, and 120 kHz are supported. Correspondingly, a corresponding time resource unit, namely, a length of a slot, includes 1 ms, 0.5 ms, 0.25 ms, 0.125 ms, and the like. When the terminal uses a relatively large subcarrier spacing, correspondingly, a time length of a used slot is relatively small. In this case, a time length of the time resource in a PRACH resource that is indicated by the base station and that is used to transmit the random access preamble may be less than a length of a time resource used to send the random access preamble. As a result, the terminal that uses the relatively large subcarrier spacing (mainly a terminal at a cell edge) cannot perform random access, and a problem of PRACH coverage limitation is caused.

SUMMARY

This application provides a wireless communication method and an apparatus, to resolve a problem of PRACH coverage limitation.

According to a first aspect, this application provides a wireless communication method. The method may be performed by a terminal or a chip in a terminal. The method includes: receiving higher layer signaling from a base station, where the higher layer signaling is used to indicate a periodicity, and configures in the periodicity, a fixed uplink time resource, a fixed downlink time resource, and a flexible time resource; receiving a broadcast message from the base station, where the broadcast message is used to indicate a random access configuration, and the random access configuration includes a time resource available to a random access preamble; and sending the random access preamble to the base station based on the random access configuration, where the time resource available to the random access preamble includes a part or all of the fixed uplink time resource, and a part or all of at least one of the fixed downlink time resource and the flexible time resource. Because the time resource that is available to the random access preamble and that is indicated by the base station not only includes the fixed uplink time resource, but also may include the fixed downlink time resource and the flexible time resource, to be specific, the fixed downlink time resource and/or the flexible time resource are used to transmit the random access preamble, a time resource for sending the random access preamble is extended, so that the time resource available to the random access preamble meets the time resource required for sending the random access preamble. Therefore, a problem of PRACH coverage limitation can be resolved, and a random access requirement of a cell-edge terminal can be met.

In a possible design, the random access configuration further includes a format of the random access preamble, and a length of a time resource that is used by the random access preamble and that is indicated by the format is less than or equal to a length of the time resource available to the random access preamble.

In a possible design, the time resource available to the random access preamble includes a part or all of a time resource, in the fixed downlink time resource, other than a fixed downlink time resource used for synchronization channel and/or broadcast channel transmission. Because the fixed downlink time resource used for synchronization channel and/or broadcast channel transmission cannot be used to transmit a preamble, the time resource available to the random access preamble indicated by the base station does not include this part of resource.

In a possible design, the time resource available to the random access preamble includes a part or all of a time resource other than a reserved time resource in the flexible time resource. The reserved time resource in the flexible time resource is not used. Therefore, the time resource available to the random access preamble indicated by the base station does not include this part of reserved resource.

In a possible design, if a configuration granularity of the time resource available to the random access preamble is a slot, the time resource available to the random access preamble includes a flexible time resource, and the flexible time resource is a slot. The method further includes: receiving slot format information for the flexible time resource, and determining that the slot format information is invalid. When the time resource available to the random access preamble includes the flexible time resource, if the slot format information for the flexible time resource is received, it is determined that the slot format information is invalid, in other words, the flexible time resource are still used to send the random access preamble.

In a possible design, a configuration granularity of the time resource available to the random access preamble is a symbol, the time resource available to the random access preamble includes the flexible time resource, and the flexible time resource is a symbol. The method further includes: receiving slot format information of a slot in which the flexible time resource is located, and determining, based on the slot format information, a transmission direction of a time resource other than the flexible time resource in the slot in which the flexible time resource is located. When the time resource available to the random access preamble includes the flexible time resource, and the flexible time resource is a symbol, if the slot format information of the slot in which the flexible time resource is located is received, only a format of the time resource in the slot other than the flexible time resource needs to be determined. The flexible time resource is determined as an uplink symbol, and is used to transmit the random access preamble.

According to a second aspect, this application provides a wireless communication method. The method may be performed by a base station or a chip in a base station. The method includes: sending higher layer signaling to a terminal, where the higher layer signaling is used to indicate a periodicity, and configures in the periodicity, a fixed uplink time resource, a fixed downlink time resource, and a flexible time resource; sending a broadcast message to the terminal, where the broadcast message is used to indicate a random access configuration, and the random access configuration includes a time resource available to a random access preamble; and receiving the random access preamble from a terminal based on the random access configuration, where the time resource available to the random access preamble includes a part or all of the fixed uplink time resource, and a part or all of at least one of the fixed downlink time resource and the flexible time resource.

In a possible design, the random access configuration further includes a format of the random access preamble, and a length of a time resource that is used by the random access preamble and that is indicated by the format is less than or equal to a length of the time resource available to the random access preamble.

In a possible design, the time resource available to the random access preamble includes a part or all of a time resource, in the fixed downlink time resource, other than a fixed downlink time resource used for synchronization channel and/or broadcast channel transmission.

In a possible design, the time resource available to the random access preamble includes a part or all of a time resource other than a reserved time resource in the flexible time resource.

According to a third aspect, this application provides a wireless communication method. The method may be performed by a terminal or a chip in a terminal. The method includes: receiving higher layer signaling from a base station, where the higher layer signaling is used to indicate a periodicity, and configures in the periodicity, a fixed uplink time resource, a fixed downlink time resource, and a flexible time resource; receiving a broadcast message from the base station, where the broadcast message is used to indicate a random access configuration, the random access configuration includes a format of a random access preamble and a time resource available to the random access preamble, the time resource available to the random access preamble includes a part or all of the fixed uplink time resource, and a length of a time resource that is used by the random access preamble and that is indicated by the format is greater than a length of the time resource available to the random access preamble; and sending the random access preamble to the base station based on the random access configuration, where a time resource actually used by the random access preamble includes the time resource available to the random access preamble, and a part or all of at least one of the fixed downlink time resource and the flexible time resource. When the time resource that is available to the random access preamble and that is indicated by the base station is insufficient, the fixed downlink time resource and/or the flexible time resource may be used to transmit the random access preamble, thereby extending a time resource for sending the random access preamble, so that the time resource actually used by the random access preamble meets the time resource required for sending the random access preamble. Therefore, a problem of PRACH coverage limitation can be resolved, and a random access requirement of a cell-edge terminal can be met.

In a possible design, the time resource actually used by the random access preamble includes a part or all of a time resource, in the fixed downlink time resource, other than a fixed downlink time resource used for synchronization channel and/or broadcast channel transmission. Because the fixed downlink time resource used for synchronization channel and/or broadcast channel transmission cannot be used to transmit a preamble, the time resource available to the random access preamble indicated by the base station does not include this part of resource.

In a possible design, the time resource actually used by the random access preamble includes a part or all of a time resource other than a reserved time resource in the flexible time resource. The reserved time resource in the flexible time resource is not used. Therefore, the time resource available to the random access preamble indicated by the base station does not include this part of reserved resource.

In a possible design, if a configuration granularity of the time resource actually used by the random access preamble is a slot, the time resource actually used by the random access preamble includes a flexible time resource, and the flexible time resource is a slot. The method further includes: receiving slot format information for the flexible time resource, and determining that the slot format information is invalid. When the time resource actually used by the random access preamble includes the flexible time resource, if the slot format information for the flexible time resource is received, it is determined that the slot format information is invalid, in other words, the flexible time resource is still used to send the random access preamble.

In a possible design, a configuration granularity of the time resource available to the random access preamble is a symbol, the time resource available to the random access preamble includes the flexible time resource, and the flexible time resource is a symbol. The method further includes: receiving slot format information of a slot in which the flexible time resource is located, and determining, based on the slot format information, a transmission direction of a time resource other than the flexible time resource in the slot in which the flexible time resource is located. When the time resource actually used by the random access preamble includes the flexible time resource, and the flexible time resource is a symbol, if the slot format information of the slot in which the flexible time resource is located is received, only a format of the time resource in the slot other than the flexible time resource needs to be determined. The flexible time resource is determined as an uplink symbol, and is used to transmit the random access preamble.

According to a fourth aspect, this application provides a wireless communication method. The method may be performed by a base station or a chip in a base station. The method includes: sending higher layer signaling to a terminal, where the higher layer signaling is used to indicate a periodicity, and configures in the periodicity, a fixed uplink time resource, a fixed downlink time resource, and a flexible time resource;

sending a broadcast message to the terminal, where the broadcast message is used to indicate a random access configuration, the random access configuration includes a format of a random access preamble and a time resource available to the random access preamble, the time resource available to the random access preamble includes a part or all of the fixed uplink time resource, and a length of a time resource that is used by the random access preamble and that is indicated by the format is greater than a length of the time resource available to the random access preamble; and receiving a random access preamble from the terminal based on the random access configuration, where a time resource actually used by the random access preamble includes: the time resource available to the random access preamble, and a part or all of at least one of the fixed downlink time resource and the flexible time resource.

In a possible design, the time resource actually used by the random access preamble includes a part or all of a time resource, in the fixed downlink time resource, other than a fixed downlink time resource used for synchronization channel and/or broadcast channel transmission.

In a possible design, the time resource actually used by the random access preamble includes a part or all of a time resource other than a reserved time resource in the flexible time resource.

According to a fifth aspect, this application provides an apparatus. The apparatus may be a terminal, or may be a chip in a terminal. The apparatus has a function for implementing each embodiment of the first aspect. The function may be implemented by hardware, or may be implemented by hardware by executing corresponding software. The hardware or software includes one or more modules corresponding to the function.

In a possible design, when the apparatus is a terminal, the terminal includes a processing unit and a communications unit. The processing unit may be, for example, a processor. The communications unit may be, for example, a transceiver. The transceiver includes a radio frequency circuit. Optionally, the terminal further includes a storage unit. The storage unit may be, for example, a memory. When the terminal includes a storage unit, the storage unit stores a computer executable instruction. The processing unit is connected to the storage unit. The processing unit executes the computer executable instruction stored in the storage unit, so that the terminal performs the wireless communication method in any possible design of the first aspect.

In another possible design, when the apparatus is a chip in a terminal, the chip includes a processing unit and a communications unit. The processing unit may be, for example, a processor. The communications unit may be, for example, an input/output interface, a pin, or a circuit. The processing unit may execute a computer executable instruction stored in a storage unit, so that the wireless communication method in any possible design of the first aspect is performed. Optionally, the storage unit is a storage unit in the chip, for example, a register or a buffer. The storage unit may alternatively be a storage unit located outside the chip in the terminal, for example, a read-only memory (ROM) or another type of static storage device capable of storing static information and an instruction, or a random access memory (RAM).

The processor mentioned anywhere above may be a general-purpose central processing unit (CPU), a microprocessor, an application-specific integrated circuit (ASIC), or one or more integrated circuits for controlling program execution of the wireless communication method in the first aspect.

According to a sixth aspect, this application provides an apparatus. The apparatus may be a base station, or may be a chip in a base station. The apparatus has a function for implementing each embodiment of the second aspect. The function may be implemented by hardware, or may be implemented by hardware by executing corresponding software. The hardware or software includes one or more modules corresponding to the function.

In a possible design, when the apparatus is a base station, the base station includes a processing unit and a communications unit. The processing unit may be, for example, a processor. The communications unit may be, for example, a transceiver. The transceiver includes a radio frequency circuit. Optionally, the base station further includes a storage unit. The storage unit may be, for example, a memory. When the base station includes a storage unit, the storage unit stores a computer executable instruction. The processing unit is connected to the storage unit. The processing unit executes the computer executable instruction stored in the storage unit, so that the base station performs the wireless communication method in any possible design of the second aspect.

In another possible design, when the apparatus is a chip in a base station, the chip includes a processing unit and a communications unit. The processing unit may be, for example, a processor. The communications unit may be, for example, an input/output interface, a pin, or a circuit. The processing unit may execute a computer executable instruction stored in a storage unit, so that the wireless communication method in any possible design of the second aspect is performed. Optionally, the storage unit is a storage unit in the chip, for example, a register or a buffer. The storage unit may alternatively be a storage unit located outside the chip in the base station, for example, a ROM, another type of static storage device capable of storing static information and an instruction, or a RAM.

The processor mentioned anywhere above may be a general-purpose CPU, a microprocessor, an ASIC, or one or more integrated circuits for controlling program execution of the wireless communication method in the second aspect.

According to a seventh aspect, this application provides an apparatus. The apparatus may be a terminal, or may be a chip in a terminal. The apparatus has a function for implementing each embodiment of the third aspect. The function may be implemented by hardware, or may be implemented by hardware by executing corresponding software. The hardware or software includes one or more modules corresponding to the function.

In a possible design, when the apparatus is a terminal, the terminal includes a processing unit and a communications unit. The processing unit may be, for example, a processor. The communications unit may be, for example, a transceiver. The transceiver includes a radio frequency circuit. Optionally, the terminal further includes a storage unit. The storage unit may be, for example, a memory. When the terminal includes a storage unit, the storage unit stores a computer executable instruction. The processing unit is connected to the storage unit. The processing unit executes the computer executable instruction stored in the storage unit, so that the terminal performs the wireless communication method in any possible design of the third aspect.

In another possible design, when the apparatus is a chip in a terminal, the chip includes a processing unit and a communications unit. The processing unit may be, for example, a processor. The communications unit may be, for example, an input/output interface, a pin, or a circuit. The processing unit may execute a computer executable instruction stored in a storage unit, so that the wireless communication method in any possible design of the third aspect is performed. Optionally, the storage unit is a storage unit in the chip, for example, a register or a buffer. The storage unit may alternatively be a storage unit located outside the chip in the terminal, for example, a ROM, another type of static storage device capable of storing static information and an instruction, or a RAM.

The processor mentioned anywhere above may be a general-purpose CPU, a microprocessor, an ASIC, or one or more integrated circuits for controlling program execution of the wireless communication method in the third aspect.

According to an eighth aspect, this application provides an apparatus. The apparatus may be a base station, or may be a chip in a base station. The apparatus has a function for implementing each embodiment of the fourth aspect. The function may be implemented by hardware, or may be implemented by hardware by executing corresponding software. The hardware or software includes one or more modules corresponding to the function.

In a possible design, when the apparatus is a base station, the base station includes a processing unit and a communications unit. The processing unit may be, for example, a processor. The communications unit may be, for example, a transceiver. The transceiver includes a radio frequency circuit. Optionally, the base station further includes a storage unit. The storage unit may be, for example, a memory. When the base station includes a storage unit, the storage unit stores a computer executable instruction. The processing unit is connected to the storage unit. The processing unit executes the computer executable instruction stored in the storage unit, so that the base station performs the wireless communication method in any possible design of the fourth aspect.

In another possible design, when the apparatus is a chip in a base station, the chip includes a processing unit and a communications unit. The processing unit may be, for example, a processor. The communications unit may be, for example, an input/output interface, a pin, or a circuit. The processing unit may execute a computer executable instruction stored in a storage unit, so that the wireless communication method in any possible design of the fourth aspect is performed. Optionally, the storage unit is a storage unit in the chip, for example, a register or a buffer. The storage unit may alternatively be a storage unit located outside the chip in the base station, for example, a ROM, another type of static storage device capable of storing static information and an instruction, or a RAM.

The processor mentioned anywhere above may be a general-purpose CPU, a microprocessor, an ASIC, or one or more integrated circuits for controlling program execution of the wireless communication method in the fourth aspect.

According to a ninth aspect, this application further provides a computer readable storage medium. The computer readable storage medium stores an instruction. When the instruction is run on a computer, the computer performs the methods in the foregoing aspects.

According to a tenth aspect, this application further provides a computer program product that includes an instruction. When the computer program product is run on a computer, the computer is enabled to perform the methods in the foregoing aspects.

In addition, for technical effects brought by any design manner of the second aspect, and the fourth aspect to the tenth aspect, refer to technical effects brought by different design manners of the first aspect or the third aspect. Details are not described herein again.

These aspects or other aspects of this application are clearer and more comprehensible in descriptions of the following embodiments.

DESCRIPTION OF EMBODIMENTS

To make the objectives, technical solutions, and advantages of this application clearer, the following further describes this application in detail with reference to the accompanying drawings. A specific operation method in a method embodiment may also be applied to an apparatus embodiment or a system embodiment. In the descriptions of this application, unless otherwise specified, "a plurality of" means two or more.

It should be noted that, a wireless communication method in this application may be performed by an apparatus. On a network side, the apparatus may be a base station or a chip in a base station, to be specific, the base station or the chip in the base station may perform the wireless communication method in this application. On a terminal side, the apparatus may be a terminal or a chip in a terminal, to be specific, the terminal or the chip in the terminal may perform the wireless communication method in this application.

For ease of description, in this application, the wireless communication method is described via an example in which the apparatus is the base station or the terminal. For an implementation method in which the apparatus is the chip in the base station or the chip in the terminal, refer to a specific description of the wireless communication method performed by the base station or the terminal. Details are not described again.

Figure 1:
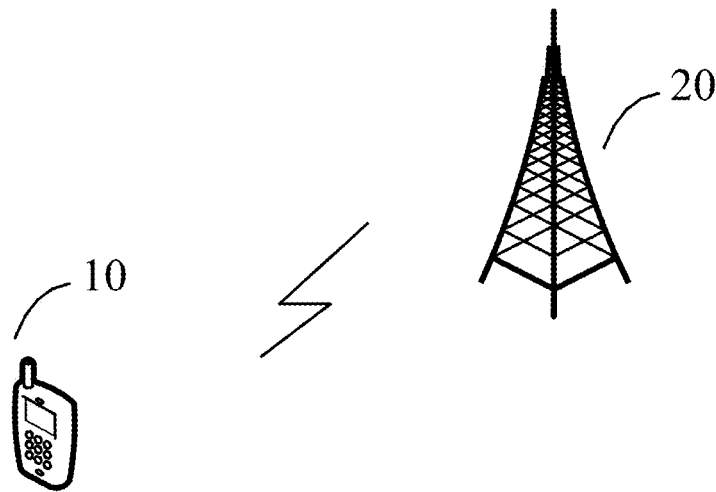
FIG. 1 is a schematic diagram of a possible network architecture according to this application.

FIG. 1 is a schematic diagram of a possible network architecture according to this application. The network architecture includes at least one terminal 10. The terminal 10 communicates with a base station 20 viathrough a wireless interface. For clarity, only one base station and one terminal are shown in the figure.

The terminal is a device that has a wireless transmission/reception function, and may be deployed on land. The terminal includes an indoor device, an outdoor device, a handheld device, or an in-vehicle device. Alternatively, the terminal may be deployed on the water (for example, on a ship), or may be deployed in the air (for example, on a plane, a balloon, or a satellite). The terminal may be a mobile phone, a tablet computer (e.g. pad), a computer that has a wireless transmission/reception function, a virtual reality (VR) terminal, an augmented reality (AR) terminal, a wireless terminal in industrial control, a wireless terminal in self-driving, a wireless terminal in remote medical treatment, a wireless terminal in a smart grid, a wireless terminal in transportation safety, a wireless terminal in a smart city, a wireless terminal in a smart home, or the like.

A base station is a device that connects a terminal to a wireless network, and includes but is not limited to: a gNodeB (gNB) in 5G, an evolved NodeB (eNB), a radio network controller (RNC), a NodeB (NB), a base station controller (BSC), a base transceiver station (BTS), a home NodeB (for example, a home evolved nodeB or a home node B, HNB), a baseband unit (BBU), a transmission/reception point (TRP), a transmission point (TP), a mobile switching center, and the like. In addition, the base station may further include a wireless fidelity (wifi) access point (AP), and the like.

In this application, a time resource is a resource in a time dimension, and corresponds to a frequency resource in a frequency dimension. The time resource may also be referred to as a time domain resource, and the frequency resource may also be referred to as a frequency domain resource. In this application, content of the present application is described via the names of the time resource and the frequency resource, and details are not described again subsequently.

In LTE, a manner in which the base station indicates, to the terminal, a time resource that can be used to send a random access preamble is as follows:

The base station sends higher layer signaling to the terminal, where the higher layer signaling is used to indicate a periodicity, and configures in the periodicity, a fixed uplink time resource and a fixed downlink time resource.

The base station sends a broadcast message to the terminal, where the broadcast message is used to indicate a random access configuration, the random access configuration includes a time resource available to a random access preamble, and the time resource available to the random access preamble includes the fixed uplink time resource.

Certainly, in actual application, the base station further configures a frequency resource for the terminal. Specifically, the random access configuration further includes a configured frequency resource. Because a frequency resource configuration method in this application is the same as that in the prior art, the frequency resource configuration method is not specifically described in the embodiments of this application. For the specific description, refer to a configuration method provided in the prior art. Details are not described again subsequently.

Figure 2:
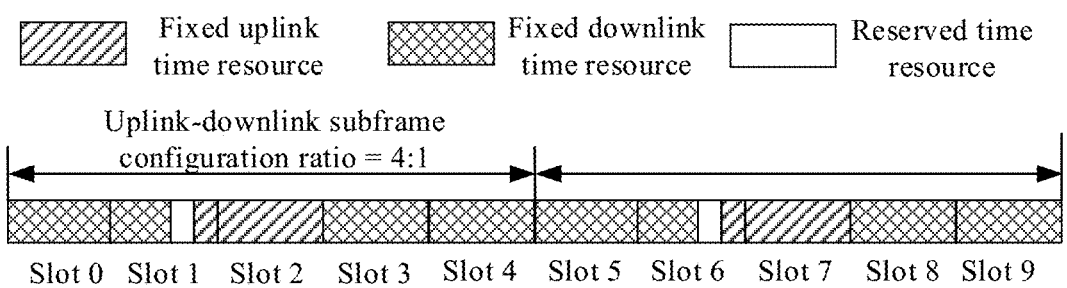
FIG. 2 is a schematic diagram of a time resource available to a random access preamble in the prior art.

For example, FIG. 2 is a schematic diagram of a time resource available to a random access preamble in the prior art. A configuration granularity of the time resource is a slot. A base station indicates a format of each slot in a system frame via higher layer signaling. Specifically, one slot is used for uplink transmission or all symbols are used for uplink transmission. For example, a slot 2 and a slot 7 shown in FIG. 2 or all symbols are used for downlink transmission. For example, a slot 0, a slot 3, and the like shown in FIG. 2 or some symbols are used for uplink transmission, and some symbols are used for downlink transmission. Some symbols are used as reserved resources and are not used, for example, a slot 1 and a slot 6 shown in FIG. 2.

Further, the base station further indicates, via a broadcast message, a time resource that is in a configured uplink time resource and that is used to transmit the random access preamble. Referring to FIG. 2, for example, the base station configures that the time resource used to transmit the random access preamble is the slot 2. It should be noted that it is configured that time resources used to transmit the random access preamble are continuous time resources.

With continuous development of communications technologies, in 5G, there will be a plurality of types of slot formats, and a time length of a slot may be less than a time length of a slot in LTE. Therefore, if a method in LTE is still used, the random access preamble may not be sent. For example, referring to FIG. 2, in 5G, if the method in LTE is used, it indicates that the slot 2 is the time resource for sending the random access preamble. It is assumed that a time length of the slot 2 is 0.5 ms, which is less than 1 ms, where 1 ms is a time length of a slot in LTE. In addition, a time length required by a to-be-sent random access preamble is between 0.5 ms and 1 ms. As a result, the slot 2 cannot be used to send the random access preamble. In addition, because the slot 3 after the slot 2 is a fixed downlink time resource, and cannot be allocated for sending the random access preamble either, there is not enough uplink time resource for sending the random access preamble. Consequently, some terminals cannot send the random access preamble. This may cause a problem of cell coverage limitation.

To resolve the foregoing problem, a plurality of solutions are proposed in this application.

Figure 3:
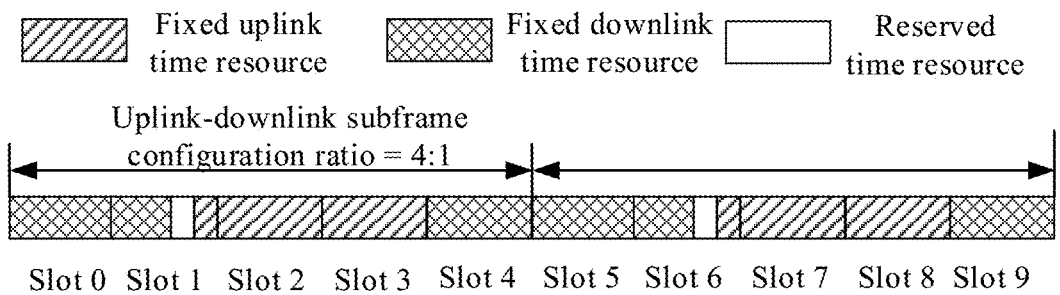
FIG. 3 is a schematic diagram obtained after an uplink-downlink subframe configuration ratio of the time resource shown in FIG. 2 changes.

For example, one solution is to change an uplink-downlink subframe configuration ratio, so as to increase a quantity of uplink subframes. FIG. 3 is a schematic diagram obtained after an uplink-downlink subframe configuration ratio of the time resource shown in FIG. 2 changes. A slot 3 and a slot 7 are configured as uplink subframes. Therefore, in a first periodicity, a slot 2 and the slot 3 may be used to transmit a random access preamble, and in a second periodicity, the slot 7 and a slot 8 may be used to transmit the random access preamble.

The method may be used to resolve a problem of cell coverage limitation. However, a main problem of the method is that the uplink-downlink subframe configuration ratio is determined based on uplink-downlink service load of a cell. Specifically, the uplink-downlink subframe configuration ratio is determined based on statistics of an uplink-downlink transmission requirement. If a ratio with more uplink time resources is configured to increase a PRACH transmission time resource, in a scenario in which a downlink service volume is far greater than an uplink service volume, a downlink resource determined based on the uplink-downlink subframe configuration ratio cannot meet a transmission requirement of a downlink service, and the uplink time resource may be idle and not used. As a result, resource utilization is reduced.

Another solution to resolve the foregoing problem is further proposed in this application, which is specifically described below.

Figure 4:
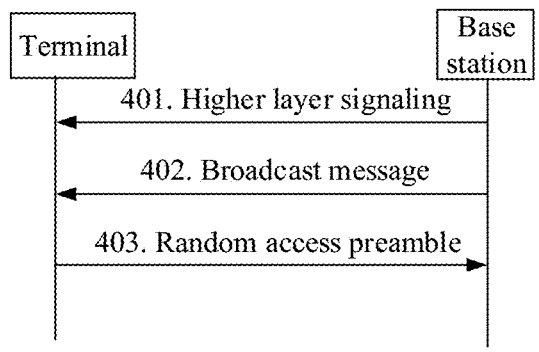
FIG. 4 shows a wireless communication method according to this application.

FIG. 4 shows a wireless communication method provided in this application. The method includes the following steps.

Step 401: A base station sends higher layer signaling to a terminal, and the terminal receives the higher layer signaling from the base station.

The higher layer signaling is used to indicate a periodicity, and configures in the periodicity, a fixed uplink time resource, a fixed downlink time resource, and a flexible time resource.

Step 402: The base station sends a broadcast message to the terminal, and the terminal receives the broadcast message from the base station.

The broadcast message is used to indicate a random access configuration, and the random access configuration includes a time resource available to a random access preamble.

Step 403: The terminal sends the random access preamble to the base station, and the base station receives a random access preamble from the terminal.

Specifically, the terminal sends the random access preamble to the base station based on the random access configuration, and the base station receives a random access preamble from the terminal based on the random access configuration.

Specifically, in step 401, the higher layer signaling sent by the base station to the terminal may be a system information block (SIB), broadcast signaling, radio resource control (RRC) signaling, a media access control (MAC) control element (CE), remaining minimum system information (RMSI), or the like.

In this application, a time resource is divided into a fixed time resource and a flexible time resource. The fixed time resource further includes a fixed uplink time resource and a fixed downlink time resource.

For example, if a slot is used as a unit, the fixed time resource includes a fixed slot, and the flexible time resource includes a flexible slot. In the fixed slot, all symbols are fixed for uplink or all symbols are fixed for downlink. A transmission direction of each symbol in the fixed slot is semi-statically configured by the base station via the higher layer signaling. A transmission direction of each symbol in the flexible slot is variable. Specifically, the base station dynamically indicates, via downlink control information, a transmission direction of each symbol in a slot used for each transmission.

For another example, if a symbol is used as a unit, the fixed time resource includes a symbol configured for uplink transmission and a symbol configured for downlink transmission. In other words, the fixed time resource includes a fixed uplink symbol and a fixed downlink symbol. The flexible time resource includes a flexible symbol, and a transmission direction of each symbol in the flexible time resource is dynamically indicated by the base station via downlink control information.

Certainly, a subframe may alternatively be used as a unit, or a system frame is used as a unit. An implementation method in which the subframe or the system frame is used as the unit is similar to that in which a slot is used as a unit. A unit of the time resource unit is not limited in this application.

Figure 5A:
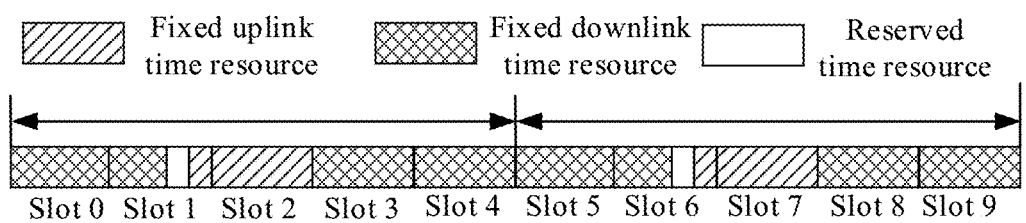
FIG. 5(a) is a schematic diagram of a resource configuration according to this application.
Figure 5B:
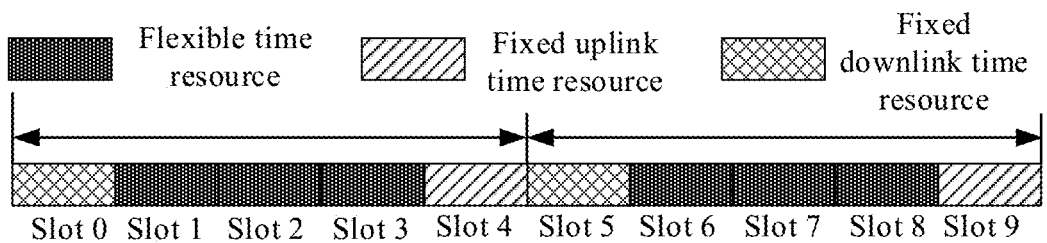
FIG. 5(b) is a schematic diagram of another resource configuration according to this application.
Figure 5C:
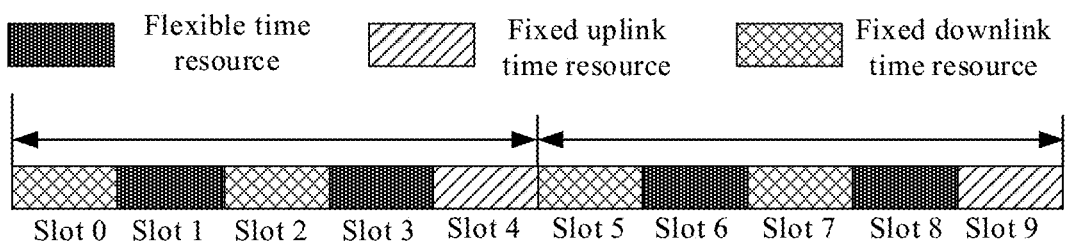
FIG. 5(c) is a schematic diagram of another resource configuration according to this application.

For example, a slot is used as a unit of a time resource. FIG. 5(a) to FIG. 5(c) are schematic diagrams of resource configurations according to this application. In FIG. 5(a), each slot is configured with a fixed uplink time resource or a fixed downlink time resource, in other words, no flexible time resource is included in FIG. 5(a). In FIG. 5(b) and FIG. 5(c), in addition to a fixed time resource, the flexible time resource is further included.

For the flexible time resource, in FIG. 5(b) and FIG. 5(c), the flexible time resource includes a flexible slot. A transmission direction of a symbol in the flexible slot is dynamically indicated by a base station. For example, each slot includes seven symbols is used. A transmission direction of each symbol may be uplink, downlink, or unknown. In this case, each slot has $3^7$ formats. Specifically, a format of a slot is indicated by the base station. For another example, if one slot includes 14 symbols, each slot has $3^{14}$ formats.

Certainly, in actual use, not all formats are used. Generally, to-be-used formats are pre-defined, and then the base station indicates, via indication information, a format used in each flexible slot.

Figure 6:
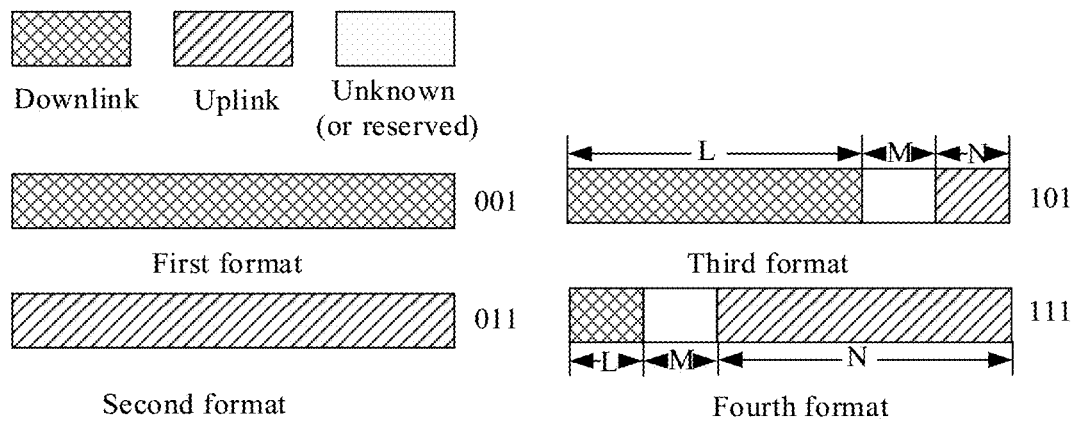
FIG. 6 is a diagram of an example of a slot format according to this application.

For example, FIG. 6 is a diagram of an example of a slot format according to this application. It is assumed that four used flexible slot formats are defined in a protocol. The first slot format is that all symbols are downlink symbols, and is represented by "001". The second slot format is that all symbols are uplink symbols, and is represented by "011". The third slot format is: L consecutive downlink symbols+M consecutive unknown symbols+N consecutive uplink symbols, where L+M+N is equal to a quantity of symbols included in one slot, L>N, and values of L, M, and N are all defined in the protocol. The third slot format is represented by "101". The fourth slot format is: L consecutive downlink symbols+M consecutive unknown symbols+N consecutive uplink symbols, where L+M+N is equal to a quantity of symbols included in one slot, L<N, and values of L, M, and N are all defined in the protocol. The fourth slot format is represented by "111".

Both a base station and a terminal pre-store the information about these types of formats. Therefore, for a slot, for example, when a slot format indicated by the base station is "001", the terminal learns that a format of the slot is that all symbols are used for downlink. For another example, when a slot format indicated by the base station is "111", the terminal learns that a format of the slot is: L consecutive downlink symbols+M consecutive unknown symbols+N consecutive uplink symbols, where L<N, and values of L, M, and N are all defined in the protocol.

It should be noted that an unknown time resource may also be understood as a reserved time resource, for example, the third format and the fourth format shown in FIG. 6. An unknown symbol in the unknown time resource may also be understood as a reserved symbol. The reserved symbol is not used as a used symbol.

In step 401, the base station may indicate a time resource in a periodicity, including a time resource indicated as fixed uplink, a time resource indicated as fixed downlink, and a flexible time resource.

In step 402, the base station sends a broadcast message to the terminal. The broadcast message may be, for example, a SIB or an RMSI. The broadcast message is used to indicate a random access configuration to the terminal. The random access configuration includes a time resource available to a random access preamble. The random access configuration further includes a format of the random access preamble, a frequency resource available to the random access preamble, and other configuration information. In this application, improvement is made on a time resource configuration method, and a frequency resource configuration method is not discussed. For the frequency resource configuration method, refer to a related method in the prior art.

The format of the random access preamble included in the random access configuration indicates a length of a time resource used by the random access preamble. Alternatively, it may be understood that the format of the random access preamble indicates a length of a time resource required for sending the random access preamble.

Two cases are described below based on a type of a time resource included in the time resource available to the random access preamble.

Case 1: The time resource available to the random access preamble includes a part or all of a fixed uplink time resource that is in a periodicity and that is configured via higher layer signaling, and further includes a part or all of at least one of a fixed downlink time resource that is in the periodicity and that is configured via the higher layer signaling and a flexible time resource that is in the periodicity configured via the higher layer signaling.

Specifically, the time resource available to the random access preamble includes: a part or all of the fixed uplink time resource indicated by the higher layer signaling, and a part or all of the fixed downlink time resource indicated by the higher layer signaling.

Alternatively, the time resource available to the random access preamble includes: a part or all of the fixed uplink time resource indicated by the higher layer signaling, and a part or all of the flexible time resource indicated by the higher layer signaling.

Alternatively, the time resource available to the random access preamble includes: a part or all of the fixed uplink time resource indicated by the higher layer signaling, a part or all of the fixed downlink time resource indicated by the higher layer signaling, and a part or all of the flexible time resource indicated by the higher layer signaling.

In other words, the time resource available to the random access preamble not only includes the fixed uplink time resource, but also may include the fixed downlink time resource and/or the flexible time resource. Therefore, the time resource available to the random access preamble is extended.

In this case, because the time resource that is available to the random access preamble and that is indicated by the base station not only includes the fixed uplink time resource, but also may include the fixed downlink time resource and the flexible time resource, to be specific, the fixed downlink time resource and/or the flexible time resource is used to transmit the random access preamble, a time resource for sending the random access preamble is extended, so that the time resource available to the random access preamble meets the time resource required for sending the random access preamble. Therefore, a random access requirement of a cell-edge terminal can be met, and a problem of PRACH coverage limitation can be resolved.

The length of the time resource used by the random access preamble is the length of the time resource required for sending the random access preamble.

Descriptions are provided below via an example with reference to FIG. 5(a) to FIG. 5(c).

For example, if a time resource configuration indicated by the base station via the higher layer signaling in step 401 is shown in FIG. 5(a), and if a time length of a slot 2 is greater than or equal to the length of the time resource required for sending the random access preamble, the slot 2 is configured as the time resource available to the random access preamble. If a time length of a slot 2 is less than the length of the time resource required for sending the random access preamble, a fixed downlink time resource after the slot 2 may also be configured as the time resource available to the random access preamble. For example, if a sum of time lengths of the slot 2 and a slot 3 is greater than or equal to the length of the time resource required for sending the random access preamble, the slot 2 and the slot 3 are configured as the time resource available to the random access preamble. Certainly, if a sum of time lengths of the slot 2 and a slot 3 is still less than the length of the time resource required for sending the random access preamble, a slot 4 may also be configured as the time resource available to the random access preamble. In other words, the slot 2, the slot 3, and the slot 4 are configured as the time resource available to the random access preamble.

The length of the time resource required for sending the random access preamble is indicated by a format of the random access preamble in the random access configuration sent by the base station. Details are not described again subsequently.

Therefore, in the foregoing method, the fixed uplink time resource and the fixed downlink time resource after the fixed uplink time resource may be configured as the time resource available to the random access preamble, so that a length of the time resource available to the random access preamble is greater than or equal to the length of the time resource required for sending the random access preamble.

For another example, if a time resource configuration indicated by the base station via the higher layer signaling in step 401 is shown in FIG. 5(b), to be specific, a time resource configured by the base station includes a fixed uplink time resource and fixed downlink time resource, the terminal may determine a time resource other than the fixed uplink time resource and the fixed downlink time resource as a flexible time resource. For example, in FIG. 5(b), five slots are used as one periodicity. In the periodicity from a slot 0 to a slot 4, the base station indicates that the slot 0 is a fixed downlink time resource, and the slot 4 is a fixed uplink time resource. Therefore, the terminal may determine other slots, that is, the slot 1 to the slot 3, as flexible time resources, namely, flexible slots. In addition, a specific format of each flexible slot may be indicated by the base station via other signaling, such as higher layer signaling. For a format of a flexible slot, refer to the example shown in FIG. 6.

If a time length of the slot 4 is greater than or equal to the length of the time resource required for sending the random access preamble, the slot 4 is configured as the time resource available to the random access preamble. If a time length of the slot 4 is less than the length of the time resource required for sending the random access preamble, the slot 3 before the slot 4 may also be configured as the time resource available to the random access preamble. For example, if a sum of time lengths of the slot 3 and the slot 4 is greater than or equal to the length of the time resource required for sending the random access preamble, the slot 3 and the slot 4 are configured as the time resource available to the random access preamble. Certainly, if the sum of time lengths of the slot 3 and the slot 4 is still less than the length of the time resource required for sending the random access preamble, the slot 2 may also be configured as the time resource available to the random access preamble. To be specific, the slot 2, the slot 3, and the slot 4 are configured as the time resource available to the random access preamble until a length of a configured time resource available to the random access preamble is greater than or equal to the length of the time resource required for sending the random access preamble.

Therefore, in the foregoing method, the fixed uplink time resource and the flexible time resource before the fixed uplink time resource may be configured as the time resource available to the random access preamble, so that the length of the time resource available to the random access preamble is greater than or equal to the length of the time resource required for sending the random access preamble.

For another example, if a time resource configuration indicated by the base station via the higher layer signaling in step 401 is shown in FIG. 5(*c*), to be specific, a time resource configured by the base station includes a fixed uplink time resource and fixed downlink time resource, the terminal may determine a time resource other than the fixed uplink time resource and the fixed downlink time resource as a flexible time resource. For example, in FIG. 5(*c*), five slots are used as one periodicity. In the periodicity from a slot 0 to a slot 4, the base station indicates that the slot 0 and the slot 2 are fixed downlink time resources, and the slot 4 is a fixed uplink time resource. Therefore, the terminal may determine other slots, that is, the slot 1 and the slot 3, as flexible time resources, namely, flexible slots. In addition, a specific format of each flexible slot may be indicated by the base station via other signaling, such as higher layer signaling. For a format of a flexible slot, refer to the example shown in FIG. 6.

If a time length of the slot 4 is greater than or equal to the length of the time resource required for sending the random access preamble, the slot 4 is configured as the time resource available to the random access preamble. If a time length of the slot 4 is less than the length of the time resource required for sending the random access preamble, the slot 3 (the slot 3 is a flexible slot) before the slot 4 may also be configured as the time resource available to the random access preamble. For example, if a sum of time lengths of the slot 3 and the slot 4 is greater than or equal to the length of the time resource required for sending the random access preamble, the slot 3 and the slot 4 are configured as the time resource available to the random access preamble. Certainly, if the sum of time lengths of the slot 3 and the slot 4 is still less than the length of the time resource required for sending the random access preamble, the slot 2 (the slot 2 is the fixed downlink time resource) may also be configured as the time resource available to the random access preamble. To be specific, the slot 2, the slot 3, and the slot 4 are configured as the time resource available to the random access preamble until a length of a configured time resource available to the random access preamble is greater than or equal to the length of the time resource required for sending the random access preamble.

Therefore, in the foregoing method, the fixed uplink time resource, the flexible time resource before the fixed uplink time resource, and the fixed downlink time resource may be configured as the time resource available to the random access preamble, so that the length of the time resource available to the random access preamble is greater than or equal to the length of the time resource required for sending the random access preamble.

In the foregoing several examples, the time resource that is available to the random access preamble and that is configured by the base station for the terminal includes at least a fixed uplink time resource. When the fixed uplink time resource is insufficient, fixed downlink time resources before and after the fixed uplink time resource and/or a flexible time resource before and after the fixed uplink time resource may also be configured as the time resource available to the random access preamble.

It should be noted that the fixed downlink time resource included in the time resource available to the random access preamble is a part or all of a fixed downlink time resource that is in a periodicity and that is configured by the base station via higher layer signaling. The flexible time resource included in the time resource available to the random access preamble is a part or all of a flexible time resource that is in the periodicity and that is configured by the base station via the higher layer signaling.

In a possible design, if the time resource available to the random access preamble includes a fixed downlink time resource, the fixed downlink time resource does not belong to a synchronization signal block (SS-block). That the fixed downlink time resource belongs to the SS-block may alternatively be understood that the fixed downlink time resource is used for synchronization channel and/or broadcast channel transmission. To be specific, in this application, the time resource available to the random access preamble includes a part or all of a time resource, in the fixed downlink time resource, other than the fixed downlink time resource used for synchronization channel and/or broadcast channel transmission.

FIG. 5(*a*) is used as an example. If the slot 3 is used for synchronization channel transmission and/or broadcast channel transmission, the slot 3 cannot be configured as the time resource available to the random access preamble. For example, if a time length of the slot 2 is less than a length of a time resource required for sending the random access preamble, because the slot 3 cannot be configured as the time resource available to the random access preamble, the base station may skip the periodicity, and configure, for the terminal in a next periodicity, a time resource available to the random access preamble.

In another possible design, if the time resource available to the random access preamble includes a flexible time resource, the flexible time resource cannot include a reserved time resource. In other words, in this application, the time resource available to the random access preamble includes a part or all of a time resource other than the reserved time resource in the flexible time resource.

FIG. 5(*c*) is used as an example. If a slot format of the slot 3 is the fourth format shown in FIG. 6, M reserved symbols in the slot 3 cannot be used as the time resource available to the random access preamble. Therefore, if a sum of time lengths of the slot 4 and N uplink symbols in the slot 3 is greater than or equal to the length of the time resource required for sending the random access preamble, the N uplink symbols in the slot 3 and the slot 4 may be configured as the time resource available to the random access preamble. If a sum of time lengths of the slot 4 and N uplink symbols in the slot 3 is less than the length of the time resource required for sending the random access preamble, the base station may skip the periodicity, and configure, for the terminal in a next periodicity, a time resource available to the random access preamble.

In a possible design, if a configuration granularity of the time resource available to the random access preamble is a slot, the time resource available to the random access preamble includes a flexible time resource, and the flexible time resource is a slot. When receiving slot format information for the flexible time resource, the terminal determines that the slot format information is invalid.

For example, referring to FIG. 5(*b*), if the base station configures the slot 4 and the slot 3 as the time resource available to the random access preamble, when receiving slot format information for the slot 3, the terminal directly determines that the slot format information is invalid or discards the slot format information. The slot format information is used to indicate a slot format. For example, FIG. 6 shows several examples of slot formats. The base station indicates a format of a slot via the slot format information, to be specific, indicates a transmission direction of a symbol in the slot.

Certainly, in the foregoing design, because the slot format information is invalid for the terminal, the base station may not send the slot format information.

In another possible design, if a configuration granularity of the time resource available to the random access preamble is a symbol, the time resource available to the random access preamble includes a flexible time resource. The flexible time resource is a symbol. When the terminal receives slot format information of a slot in which the flexible time resource is located, the terminal still determines the flexible time resource as the time resource available to the random access preamble, and determines, based on the slot format information, a transmission direction of a time resource other than the flexible time resource in the slot in which the flexible time resource is located.

For example, referring to FIG. 5(*b*), an example in which one slot includes seven symbols is used. If the base station configures the slot 4 and last four symbols in the slot 3 as the time resource available to the random access preamble, when the terminal receives slot format information of the slot 3, for example, the indicated slot format information of the slot 3 is the first format in FIG. 6, the terminal determines, based on the slot format information, that first three symbols in the slot 3 are downlink symbols. For the last four symbols in the slot 3, the terminal uses the four symbols as the time resource available to the random access preamble.

Case 2: The time resource available to the random access preamble includes a part or all of a fixed uplink time resource that is in the periodicity and that is configured by the base station via the higher layer signaling.

In this case, the time resource that is available to the random access preamble and that is configured by the base station for the terminal via the higher layer signaling is still the same as that in the prior art, and includes a fixed uplink time resource.

In other words, in this case, the base station still configures only the fixed uplink time resource for the terminal as the time resource available to the random access preamble.

For example, using FIG. 5(*a*) as an example, the base station configures the slot 2 as the time resource available to the random access preamble; using FIG. 5(*b*) as an example, the base station configures the slot 4 as the time resource available to the random access preamble; and using FIG. 5(*c*) as an example, the base station configures the slot 4 as the time resource available to the random access preamble.

If the length of the time resource available to the random access preamble is greater than or equal to the length of the time resource required for sending the random access preamble, the terminal may directly send the random access preamble on the time resource that is available to the random access preamble and that is configured by the base station. For example, if a time length of the slot 2 in FIG. 5(*a*) is greater than or equal to the length of the time resource required for sending the random access preamble, the slot 2 is configured as the time resource available to the random access preamble.

If the length of the time resource available to the random access preamble is less than the length of the time resource required for sending the random access preamble, the terminal needs to extend the time resource available to the random access preamble. Therefore, the terminal extends a time resource based on the time resource that is available to the random access preamble and that is configured by the base station, to obtain a time resource actually used by the random access preamble. In other words, the time resource actually used by the random access preamble is equal to a sum of the time resource available to the random access preamble and the extended time resource.

The extended time resource includes a part or all of a fixed downlink time resource configured by the base station via the higher layer signaling.

Alternatively, the extended time resource includes a part or all of a flexible time resource configured by the base station via the higher layer signaling.

Alternatively, the extended time resource includes a part or all of a fixed downlink time resource configured by the base station via the higher layer signaling, and a part or all of a flexible time resource configured by the base station via the higher layer signaling.

In the foregoing method, when the time resource that is available to the random access preamble and that is indicated by the base station is insufficient, the fixed downlink time resource and/or the flexible time resource may be used to transmit the random access preamble, thereby extending a time resource for sending the random access preamble, so that the time resource actually used by the random access preamble meets the time resource required for sending the random access preamble. Therefore, a random access requirement of a cell-edge terminal can be met, and a problem of PRACH coverage limitation can be resolved.

Descriptions are provided below via an example with reference to FIG. 5(*a*) to FIG. 5(*c*).

FIG. 5(*a*) is used as an example. The time resource that is available to the random access preamble and that is configured by the base station is the slot 2. A time length of the slot 2 is less than the length of the time resource required for sending the random access preamble. In this case, the terminal may use the slot 3 as an extended time resource and also as the time resource available to the random access preamble. If a sum of time lengths of the slot 2 and the slot 3 is greater than or equal to the length of the time resource required for sending the random access preamble, the terminal determines the slot 2 and the slot 3 as the time resource actually used by the random access preamble. Certainly, if a sum of time lengths of the slot 2 and the slot 3 is less than the length of the time resource required for sending the random access preamble, the terminal may further add an extended time resource until a time length of the time resource actually used by the random access preamble is greater than or equal to the length of the time resource required for sending the random access preamble, for example, the slot 3 and the slot 4 are used as extended time resources.

Therefore, in the foregoing method, the time resource that is actually used by the random access preamble and that is determined by the terminal includes the fixed uplink time resource and the fixed downlink time resource, so that the time length of the time resource actually used by the random access preamble is greater than or equal to the length of the time resource required for sending the random access preamble.

FIG. 5(*b*) is used as an example. The time resource that is available to the random access preamble and that is configured by the base station is the slot 4, and a time length of the slot 4 is less than the length of the time resource required for sending the random access preamble. In this case, the terminal may use the slot 3 as an extended time resource and also as the time resource available to the random access preamble. If a sum of time lengths of the slot 3 and the slot 4 is greater than or equal to the length of the time resource required for sending the random access preamble, the terminal determines the slot 3 and the slot 4 as the time resource actually used by the random access preamble. Certainly, if a sum of time lengths of the slot 3 and the slot 4 is less than the length of the time resource required for sending the random access preamble, the terminal may further add an extended time resource until a time length of the time resource actually used by the random access preamble is greater than or equal to the length of the time resource required for sending the random access preamble, for example, the slot 2 and the slot 3 are used as extended time resources.

Therefore, in the foregoing method, the time resource that is actually used by the random access preamble and that is determined by the terminal includes the fixed uplink time resource and the flexible time resource, so that the time length of the time resource actually used by the random access preamble is greater than or equal to the length of the time resource required for sending the random access preamble.

FIG. 5(*c*) is used as an example. The time resource that is available to the random access preamble and that is configured by the base station is the slot 4, and a time length of the slot 4 is less than the length of the time resource required for sending the random access preamble. In this case, the terminal may use the slot 3 (the flexible time resource) as an extended time resource and also as the time resource available to the random access preamble. If a sum of time lengths of the slot 3 and the slot 4 is greater than or equal to the length of the time resource required for sending the random access preamble, the terminal determines the slot 3 and the slot 4 as the time resource actually used by the random access preamble. Certainly, if a sum of time lengths of the slot 3 and the slot 4 is less than the length of the time resource required for sending the random access preamble, the terminal may further add an extended time resource until a time length of the time resource actually used by the random access preamble is greater than or equal to the length of the time resource required for sending the random access preamble, for example, the slot 2 (the fixed downlink time resource) and the slot 3 are used as extended time resources.

Therefore, in the foregoing method, the time resource that is actually used by the random access preamble and that is determined by the terminal includes: the fixed uplink time resource, the fixed downlink time resource, and the flexible time resource, so that the time length of the time resource actually used by the random access preamble is greater than or equal to the length of the time resource required for sending the random access preamble.

It should be noted that the fixed downlink time resource included in the time resource actually used by the random access preamble is a part or all of a fixed downlink time resource that is in a periodicity and that is configured by the base station via higher layer signaling. The flexible time resource included in the time resource actually used by the random access preamble is a part or all of a flexible time resource that is in the periodicity and that is configured by the base station via the higher layer signaling.

In a possible design, if the time resource actually used by the random access preamble includes a fixed downlink time resource, the fixed downlink time resource does not belong to an SS-block. For details, refer to the related description in the foregoing case 1. Details are not described herein again.

In another possible design, if the time resource actually used by the random access preamble includes a flexible time resource, the flexible time resource cannot include a reserved time resource. In other words, in this application, the time resource available to the random access preamble includes a part or all of a time resource other than the reserved time resource in the flexible time resource. For details, refer to the related description in the foregoing case 1. Details are not described herein again.

In a possible design, if a configuration granularity of the time resource actually used by the random access preamble is a slot, the time resource actually used by the random access preamble includes a flexible time resource, and the flexible time resource is a slot. When receiving slot format information for the flexible time resource, the terminal determines that the slot format information is invalid. For details, refer to the related description in the foregoing case 1. Details are not described herein again.

Certainly, in the design, because the slot format information is invalid for the terminal, the base station may not send the slot format information.

In another possible design, if a configuration granularity of the time resource actually used by the random access preamble is a symbol, the time resource actually used by the random access preamble includes a flexible time resource, and the flexible time resource is a symbol. When the terminal receives slot format information of a slot in which the flexible time resource is located, the terminal still determines the flexible time resource as the time resource actually used by the random access preamble, and determines, based on the slot format information, a transmission direction of a time resource other than the flexible time resource in the slot in which the flexible time resource is located. For details, refer to the related description in the foregoing case 1. Details are not described herein again.

The solutions provided in this application are mainly described above from a perspective of interaction between network elements. It can be understood that, to implement the foregoing functions, each network element includes a corresponding hardware structure and/or software module for implementing each function. A person of ordinary skill in the art should easily be aware that, in combination with the example units and algorithms steps described in the embodiments disclosed in this specification, the present application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present application.

Figure 7:
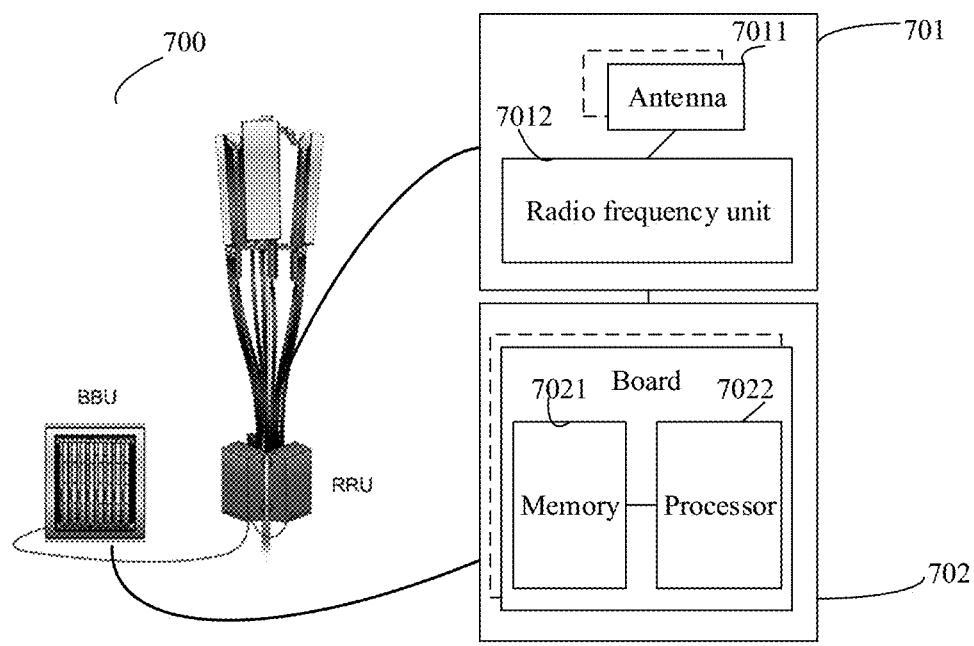
FIG. 7 is a schematic structural diagram of a base station according to this application.

Based on a same application concept, an embodiment of this application further provides a base station 700. FIG. 7 is a schematic structural diagram of the base station 700. The base station 700 may be configured to perform an action performed by the base station in the foregoing embodiment. The base station 700 includes one or more remote radio units (RRU) 701 and one or more baseband units (BBU) 702. The RRU 701 may be referred to as a transceiver unit, a transmitter/receiver, a transceiver circuit, a transceiver, or the like. The RRU 701 may include at least one antenna 7011 and at least one radio frequency unit 7012. The RRU 701 is mainly configured to: receive and send a radio frequency signal and perform conversion between a radio frequency signal and a baseband signal. The BBU 702 is mainly configured to: perform baseband processing, control the base station, and so on. The RRU 701 and the BBU 702 may be physically disposed together, or may be physically disposed separately, that is, distributed base stations.

The BBU 702 is a control center of the base station, may also be referred to as a processing unit, and is mainly configured to complete a baseband processing function such as channel coding, multiplexing, modulation, or spreading. For example, the BBU (processing unit) may be configured to control the base station to perform some actions performed by the base station in the foregoing embodiment.

In an example, the BBU 702 may include one or more boards, and a plurality of boards may jointly support a radio access network of a single access standard, or may separately support radio access networks of different access standards. The BBU 702 further includes a memory 7021 and a processor 7022. The memory 7021 is configured to store a necessary instruction and necessary data. For example, the memory 7021 stores the configuration information of the random access preamble in the foregoing embodiment. The processor 7022 is configured to control the base station to perform a necessary action. For example, the processor 7022 is configured to control the base station to perform the action performed by the base station in the foregoing embodiment. The memory 7021 and the processor 7022 may serve one or more boards. In other words, a memory and a processor may be disposed separately on each board, or a plurality of boards may share a same memory and processor. In addition, a necessary circuit is further disposed on each board.

Figure 8:
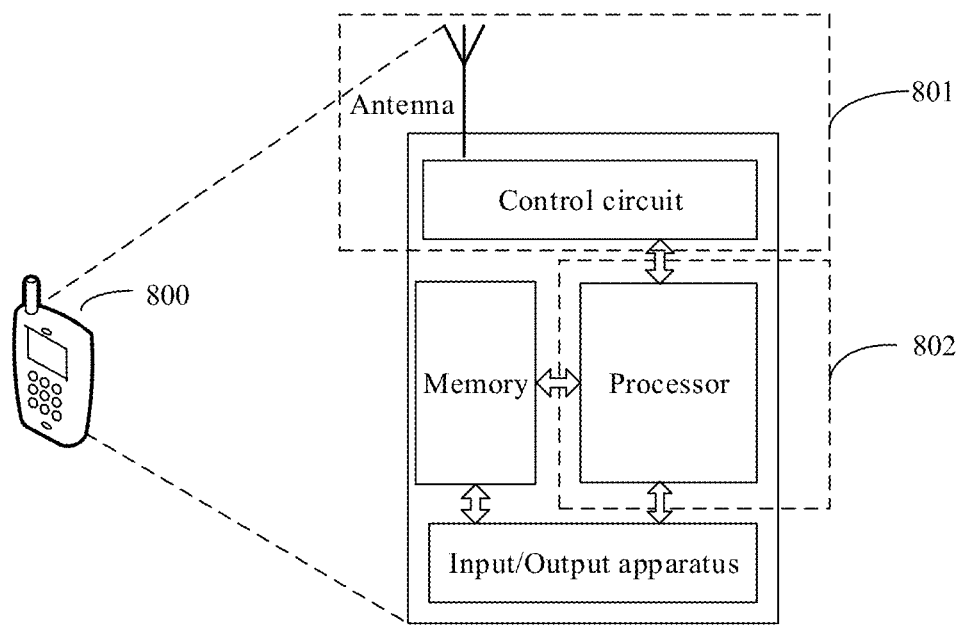
FIG. 8 is a schematic structural diagram of a terminal according to this application.

Based on a same application concept, an embodiment of this application further provides a terminal 800. FIG. 8 is a schematic structural diagram of the terminal. For ease of description, FIG. 8 shows only main components of the terminal. As shown in FIG. 8, the terminal 800 includes a processor, a memory, a control circuit, an antenna, and an input/output apparatus. The processor is mainly configured to: process a communications protocol and communication data, control the entire terminal, execute a software program, and process data of the software program, for example, configured to support the terminal in executing the action performed by the terminal in the foregoing embodiment. The memory is mainly configured to store the software program and the data, for example, store the configuration information of the random access preamble described in the foregoing embodiment. The control circuit is mainly configured to perform conversion between a baseband signal and a radio frequency signal, and process the radio frequency signal. A combination of the control circuit and the antenna may also be referred to as a transceiver. The transceiver is mainly configured to: receive and send a radio frequency signal in an electromagnetic wave form, and receive signaling sent by a base station. For details, refer to the description of the above related parts. The input/output apparatus, such as a touchscreen, a display screen, or a keyboard, is mainly configured to receive data entered by a user, and output data to the user.

After the terminal is powered on, the processor may read the software program in the storage unit, interpret and execute an instruction of the software program, and process the data of the software program. When the processor needs to send data wirelessly, after performing baseband processing on the to-be-sent data, the processor outputs a baseband signal to a radio frequency circuit. After performing radio frequency processing on the baseband signal, the radio frequency circuit sends a radio frequency signal to the outside in an electromagnetic wave form via the antenna. When data is sent to the terminal, the radio frequency circuit receives a radio frequency signal via the antenna, converts the radio frequency signal into a baseband signal, and outputs the baseband signal to the processor. The processor converts the baseband signal into data, and processes the data.

A person skilled in the art may understand that for ease of description, FIG. 8 shows only one memory and only one processor. Actually, the terminal may have a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process the communications protocol and the communication data. The central processing unit is mainly configured to: control the entire terminal, execute the software program, and process the data of the software program. The processor in FIG. 8 integrates functions of the baseband processor and the central processing unit. A person skilled in the art may understand that the baseband processor and the central processing unit may alternatively be separate processors, and are interconnected via a technology such as a bus. A person skilled in the art may understand that the terminal may include a plurality of baseband processors to adapt to different network standards, and the terminal may include a plurality of central processing units to enhance a processing capability of the terminal. The components in the terminal may be connected via various buses. The baseband processor may also be expressed as a baseband processing circuit or a baseband processing chip. The central processing unit may also be expressed as a central processing circuit or a central processing chip. A function of processing the communications protocol and the communication data may be embedded into the processor, or may be stored in the storage unit in a form of a software program. The processor executes the software program to implement a baseband processing function.

For example, in this embodiment of the present application, the antenna and the control circuit that have a transmission/reception function may be considered as a transceiver unit 801 of the terminal 800, and the processor having a processing function may be considered as a processing unit 802 of the terminal 800. As shown in FIG. 8, the terminal 800 includes the transceiver unit 801 and the processing unit 802. The transceiver unit may also be referred to as a receiver/transmitter, a transceiver, a transceiver apparatus, or the like. Optionally, a component that is in the transceiver unit 801 and that is configured to implement a receiving function may be considered as a receiving unit, and a component that is in the transceiver unit 801 and that is configured to implement a sending function is considered as a sending unit. In other words, the transceiver unit 801 includes the receiving unit and the sending unit. For example, the receiving unit may also be referred to as a receiver, a receptor, a receiver circuit, or the like, and the sending unit may be referred to as an emitter, a transmitter, a transmitter circuit, or the like.

Figure 9:
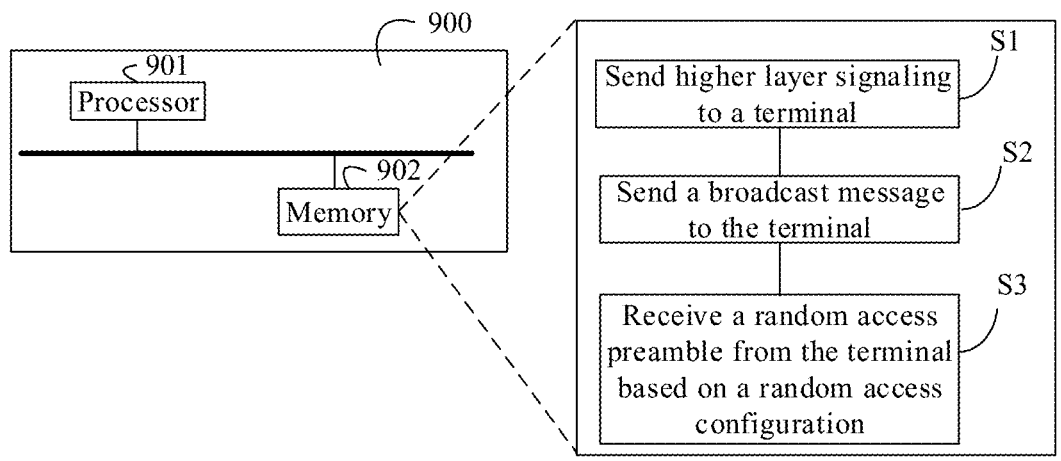
FIG. 9 is a schematic structural diagram of an apparatus according to this application.

Based on a same application concept, an embodiment of this application further provides an apparatus. The apparatus may be a base station, or may be a chip in a base station. As shown in FIG. 9, the apparatus includes at least a processor 901 and a memory 902. The processor 901 is connected to the memory 902 via a bus.

The memory 902 is configured to store a computer executable instruction, and the processor 901 is configured to execute the computer executable instruction stored in the memory 902.

The processor 901 executes the computer executable instruction stored in the memory 902, so that the apparatus 900 performs the steps performed by the base station in the communication method provided in the foregoing embodiment and in FIG. 4, or the base station deploys function units corresponding to the steps. For example, the memory 902 includes the following instructions.

Instruction S1: Send higher layer signaling to a terminal, where the higher layer signaling is used to indicate a periodicity, and configures in the periodicity, a fixed uplink time resource, a fixed downlink time resource, and a flexible time resource.

Instruction S2: Send a broadcast message to the terminal, where the broadcast message is used to indicate a random access configuration, and the random access configuration includes a time resource available to a random access preamble.

Instruction S3: Receive a random access preamble from the terminal based on the random access configuration, where the time resource available to the random access preamble includes a part or all of the fixed uplink time resource, and a part or all of at least one of the fixed downlink time resource and the flexible time resource.

Alternatively, the memory 902 includes the following instructions:

Instruction S1: Send higher layer signaling to a terminal, where the higher layer signaling is used to indicate a periodicity, and configures in the periodicity, a fixed uplink time resource, a fixed downlink time resource, and a flexible time resource.

Instruction S2: Send a broadcast message to the terminal, where the broadcast message is used to indicate a random access configuration, the random access configuration includes a format of a random access preamble and a time resource available to the random access preamble, the time resource available to the random access preamble includes a part or all of the fixed uplink time resource, and a length of a time resource that is used by the random access preamble and that is indicated by the format is greater than a length of the time resource available to the random access preamble.

Instruction S3: Receive a random access preamble the terminal based on the random access configuration, where a time resource actually used by the random access preamble includes the time resource available to the random access preamble, and a part or all of at least one of the fixed downlink time resource and the flexible time resource.

The processor 901 may include different types of processors 901 or a same type of processors 901. The processor 901 may be any one of the following: a central processing unit (CPU), an ARM processor, a field programmable gate array (FPGA), a dedicated processor, and another device having a computing processing capability. In an optional implementation, the processor 901 may alternatively be integrated as a many-core processor.

The memory 902 may be any one or any combination of the following: a random access memory (RAM), a read-only memory (ROM), a non-volatile memory (non-volatile memory, NVM), a solid-state drive (SSD), a mechanical hard disk, a magnetic disk, a disk array, and another storage medium.

Figure 10:
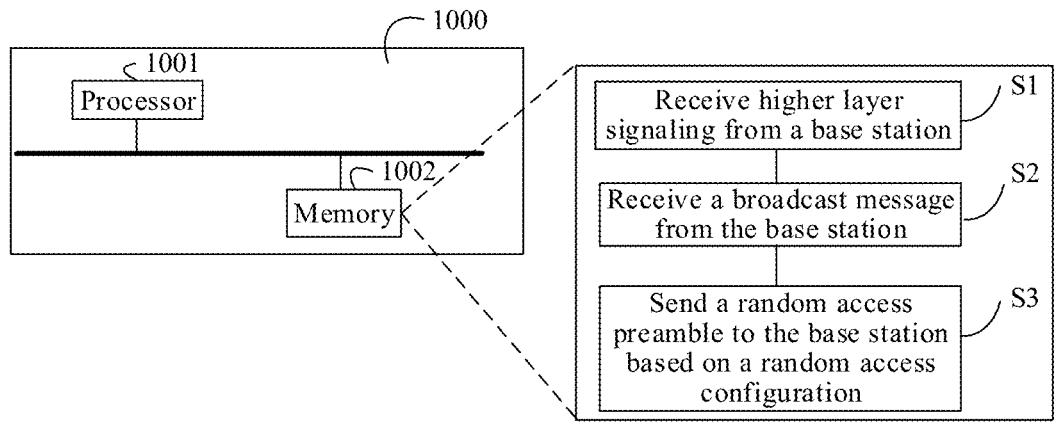
FIG. 10 is a schematic structural diagram of an apparatus according to this application.

Based on a same application concept, an embodiment of this application further provides an apparatus. The apparatus may be a terminal, or may be a chip in a terminal. As shown in FIG. 10, the apparatus includes at least a processor 1001 and a memory 1002. The processor 1001 is connected to the memory 1002 via a bus.

The memory 1002 is configured to store a computer executable instruction, and the processor 1001 is configured to execute the computer executable instruction stored in the memory 1002.

The processor 1001 executes the computer executable instruction stored in the memory 1002, so that the apparatus 1000 performs the steps performed by the terminal in the communication method provided in the foregoing embodiment and in FIG. 4, or the terminal deploys function units corresponding to the steps. For example, the memory 1002 includes the following instructions:

Instruction S1: Receive higher layer signaling from a base station, where the higher layer signaling is used to indicate a periodicity, and configures in the periodicity, a fixed uplink time resource, a fixed downlink time resource, and a flexible time resource.

Instruction S2: Receive a broadcast message from the base station, where the broadcast message is used to indicate a random access configuration, and the random access configuration includes a time resource available to a random access preamble.

Instruction S3: Send a random access preamble to the base station based on the random access configuration, where the time resource available to the random access preamble includes a part or all of the fixed uplink time resource, and a part or all of at least one of the fixed downlink time resource and the flexible time resource.

Alternatively, the memory 1002 includes the following instructions:

Instruction S1: Receive higher layer signaling from a base station, where the higher layer signaling is used to indicate a periodicity, and configures in the periodicity, a fixed uplink time resource, a fixed downlink time resource, and a flexible time resource.

Instruction S2: Receive a broadcast message from the base station, where the broadcast message is used to indicate a random access configuration, the random access configuration includes a format of a random access preamble and a time resource available to the random access preamble, the time resource available to the random access preamble includes a part or all of the fixed uplink time resource, and a length of a time resource that is used by the random access preamble and that is indicated by the format is greater than a length of the time resource available to the random access preamble.

Instruction S3: Send a random access preamble to the base station based on the random access configuration, where a time resource actually used by the random access preamble includes the time resource available to the random access preamble, and a part or all of at least one of the fixed downlink time resource and the flexible time resource.

The processor 1001 may include different types of processors 1001 or a same type of processors 1001. The processor 1001 may be any one of the following: a central processing unit (CPU), an ARM processor, a field programmable gate array (FPGA), a dedicated processor, and another device having a computing processing capability. In an optional implementation, the processor 1001 may alternatively be integrated as a many-core processor.

The memory 1002 may be any one or any combination of the following: a random access memory (RAM), a read-only memory (ROM), a non-volatile memory (NVM), a solid-state drive (SSD), a mechanical hard disk, a magnetic disk, a disk array, and another storage medium.

Figure 11:
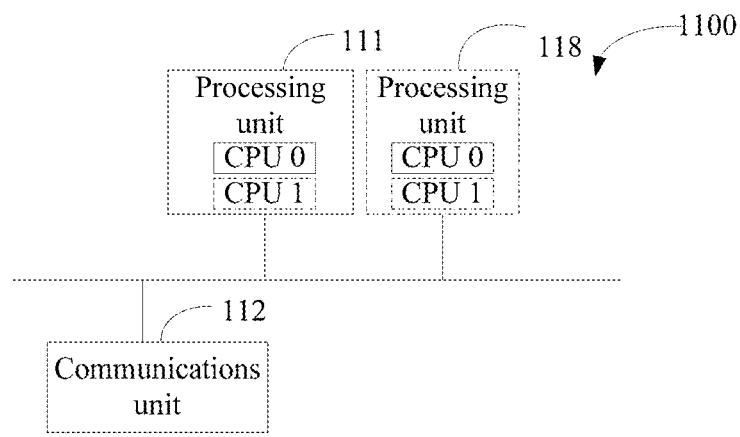
FIG. 11 is a schematic structural diagram of an apparatus according to this application.

FIG. 11 is a schematic diagram of an apparatus according to this application. The apparatus 1100 may be the base station or a chip in the base station in any one of the foregoing embodiments.

The apparatus 1100 may be configured to perform any one of the foregoing wireless communication methods. The apparatus 1100 includes at least a processing unit 111 and a communications unit 112. The processing unit 111 is connected to the communications unit 112 via a communications bus. The communications bus may include a path for transmitting information between the foregoing units.

The processing unit 111 may be a general-purpose central processing unit (CPU), a microprocessor, an application-specific integrated circuit (ASIC), or one or more integrated circuits that are configured to control program execution of the solutions of the present application.

The communications unit 112 may be an apparatus having a transmission/reception function, and is configured to communicate with another device or a communications network, such as the Ethernet, a radio access network (RAN), or a wireless local area network (WLAN).

During specific implementation, in an embodiment, the processing unit 111 may include one or more CPUs, for example, a CPU 0 and a CPU 1 in FIG. 11.

During specific implementation, in an embodiment, the apparatus 1100 may include a plurality of processing units, for example, the processing unit 111 and a processing unit 118 in FIG. 11. Each of the processing units may be a single-core (single-CPU) processor, or may be a multi-core (multi-CPU) processor. The processor herein may be one or more devices, a circuit, and/or a processing core for processing data (for example, a computer program instruction).

In a possible design, when the apparatus is a base station, the processing unit 111 may be, for example, a processor, and the communications unit 112 may be, for example, a transceiver. The transceiver includes a radio frequency circuit. When the apparatus further includes a storage unit, the storage unit is configured to store a computer executable instruction. The processing unit 111 is connected to the storage unit. The processing unit 111 executes the computer executable instruction stored in the storage unit, so that the base station performs the wireless communication method in any one of the foregoing embodiments.

In another possible design, when the apparatus is a chip in the base station, the processing unit 111 may be, for example, a processor, and the communications unit 112 may be, for example, an input/output interface, a pin, or a circuit. The processing unit 111 may execute a computer executable instruction stored in a storage unit, so that any wireless communication method in the foregoing embodiments is performed. Optionally, the storage unit is a storage unit in the chip, for example, a register or a buffer. The storage unit may alternatively be a storage unit located outside the chip in the base station, for example, a ROM, another type of static storage device capable of storing static information and an instruction, or a RAM.

That the chip performs the wireless communication method may be understood as: completing the wireless communication method via the chip with reference to another component in the apparatus.

For example, when the chip is a chip in the base station, a communications unit of the chip is connected to a transceiver of the base station. A processing unit of the chip sends higher layer signaling to the transceiver of the base station via the communications unit, and the transceiver of the base station sends the higher layer signaling to a terminal. Further, the processing unit of the chip sends a broadcast message to the transceiver of the base station via the communications unit. Then, the transceiver of the base station sends the broadcast message to the terminal. A processor of the base station controls the transceiver of the base station to receive a random access preamble from the terminal based on a random access configuration. Then, the communications unit of the chip obtains the random access preamble from the transceiver of the base station. Therefore, the wireless communication method in the embodiments of the present application is implemented via the chip of the base station.

For example, when the apparatus is divided via the method shown in FIG. 11, the processing unit coordinates with the communications unit, so that the apparatus can implement the wireless communication method in any one of the foregoing embodiments of this application.

In an implementation, the processing unit is configured to control the communications unit to:

send higher layer signaling to a terminal, where the higher layer signaling is used to indicate a periodicity, and configures in the periodicity, a fixed uplink time resource, a fixed downlink time resource, and a flexible time resource;

send a broadcast message to the terminal, where the broadcast message is used to indicate a random access configuration, and the random access configuration includes a time resource available to a random access preamble; and receive a random access preamble from the terminal based on the random access configuration.

The time resource available to the random access preamble includes a part or all of the fixed uplink time resource, and a part or all of at least one of the fixed downlink time resource and the flexible time resource.

Optionally, the random access configuration further includes:

a format of the random access preamble, and a length of a time resource that is used by the random access preamble and that is indicated by the format is less than or equal to a length of the time resource available to the random access preamble.

Optionally, the time resource available to the random access preamble includes a part or all of a time resource, in the fixed downlink time resource, other than a fixed downlink time resource used for synchronization channel and/or broadcast channel transmission.

Optionally, the time resource available to the random access preamble includes a part or all of a time resource other than a reserved time resource in the flexible time resource.

In another implementation, the processing unit is configured to control the communications unit to:

send higher layer signaling to a terminal, where the higher layer signaling is used to indicate a periodicity, and configures in the periodicity, a fixed uplink time resource, a fixed downlink time resource, and a flexible time resource;

send a broadcast message to the terminal, where the broadcast message is used to indicate a random access configuration, the random access configuration includes a format of a random access preamble and a time resource available to the random access preamble, the time resource available to the random access preamble includes a part or all of the fixed uplink time resource, and a length of a time resource that is used by the random access preamble and that is indicated by the format is greater than a length of the time resource available to the random access preamble; and receive a random access preamble from the terminal based on the random access configuration.

A time resource actually used by the random access preamble includes: the time resource available to the random access preamble, and a part or all of at least one of the fixed downlink time resource and the flexible time resource.

Optionally, the time resource actually used by the random access preamble includes a part or all of a time resource, in the fixed downlink time resource, other than a fixed downlink time resource used for synchronization channel and/or broadcast channel transmission.

Optionally, the time resource actually used by the random access preamble includes a part or all of a time resource other than a reserved time resource in the flexible time resource.

It should be understood that, the base station or the chip in the base station may be configured to implement the steps performed by the base station in the wireless communication method in the embodiments of the present application. For related features, refer to the foregoing description. Details are not described herein again.

Figure 12:
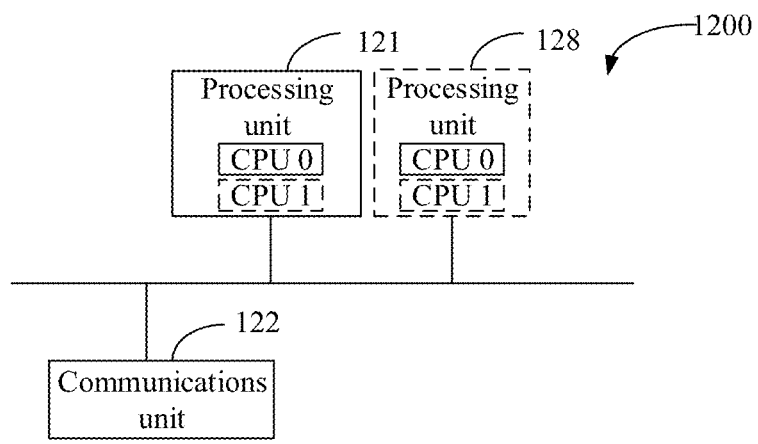
FIG. 12 is a schematic structural diagram of an apparatus according to this application.

FIG. 12 is a schematic diagram of an apparatus according to this application. The apparatus 1200 may be a terminal or a chip in a terminal in any one of the foregoing embodiments.

The apparatus 1200 may be configured to perform any one of the foregoing wireless communication methods. The apparatus 1200 includes at least one processing unit 121 and communications unit 122. The processing unit 121 is connected to the communications unit 122 via a communications bus. The communications bus may include a path for transmitting information between the foregoing units.

The processing unit 121 may be a general-purpose central processing unit (CPU), a microprocessor, an application-specific integrated circuit (ASIC), or one or more integrated circuits that are configured to control program execution of the solutions of the present application.

The communications unit 122 may be an apparatus having a transmission/reception function, and is configured to communicate with another device or a communications network, such as the Ethernet, a radio access network (RAN), or a wireless local area network (WLAN).

During specific implementation, in an embodiment, the processing unit 121 may include one or more CPUs, for example, a CPU 0 and a CPU 1 in FIG. 12.

During specific implementation, in an embodiment, the apparatus 1200 may include a plurality of processing units, for example, the processing unit 121 and a processing unit 128 in FIG. 12. Each of the processing units may be a single-core (single-CPU) processor, or may be a multi-core (multi-CPU) processor. The processor herein may be one or more devices, a circuit, and/or a processing core for processing data (for example, a computer program instruction).

In a possible design, when the apparatus is a terminal, the processing unit 121 may be, for example, a processor, and the communications unit 122 may be, for example, a transceiver. The transceiver includes a radio frequency circuit. When the apparatus further includes a storage unit, the storage unit is configured to store a computer executable instruction. The processing unit 121 is connected to the storage unit. The processing unit 121 executes the computer executable instruction stored in the storage unit, so that the terminal performs the wireless communication method in any one of the foregoing embodiments.

In another possible design, when the apparatus is a chip in a terminal, the processing unit 121 may be, for example, a processor, and the communications unit 122 may be, for example, an input/output interface, a pin, or a circuit. The processing unit 121 may execute a computer executable instruction stored in a storage unit, so that any wireless communication method in the foregoing embodiments is performed. Optionally, the storage unit is a storage unit in the chip, for example, a register or a buffer. The storage unit may alternatively be a storage unit located outside the chip in the terminal, for example, a ROM, another type of static storage device capable of storing static information and an instruction, or a RAM.

That the chip performs the wireless communication method may be understood as: completing the wireless communication method via the chip with reference to another component in the apparatus.

For example, when the chip is the chip in the terminal, a communications unit of the chip is connected to a transceiver of the terminal. A processor of the terminal may control the transceiver of the terminal to receive higher layer signaling from a base station, so that the communications unit of the chip can receive the higher layer signaling from the base station. Further, the processor of the terminal can control the transceiver of the terminal to receive a broadcast message from the base station. In this case, the communications unit of the chip may receive the broadcast message from the transceiver. A processing unit of the chip controls the communications unit of the chip to send a random access preamble to the transceiver of the terminal based on a random access configuration. Then, the transceiver of the terminal sends the random access preamble to the base station. Therefore, the wireless communication method in the embodiments of the present application is implemented via the chip in the terminal. For example, when the apparatus is divided via the method shown in FIG. 12, the processing unit coordinates with the communications unit, so that the apparatus can implement the wireless communication method in any one of the foregoing embodiments of this application.

In an implementation, the processing unit is configured to control the communications unit to:

receive higher layer signaling from a base station, where the higher layer signaling is used to indicate a periodicity, and configures in the periodicity, a fixed uplink time resource, a fixed downlink time resource, and a flexible time resource;

receive a broadcast message from the base station, where the broadcast message is used to indicate a random access configuration, and the random access configuration includes a time resource available to a random access preamble; and send the random access preamble to the base station based on the random access configuration.

The time resource available to the random access preamble includes a part or all of the fixed uplink time resource, and a part or all of at least one of the fixed downlink time resource and the flexible time resource.

Optionally, the random access configuration further includes:

a format of the random access preamble, and a length of a time resource that is used by the random access preamble and that is indicated by the format is less than or equal to a length of the time resource available to the random access preamble.

Optionally, the time resource available to the random access preamble includes a part or all of a time resource, in the fixed downlink time resource, other than a fixed downlink time resource used for synchronization channel and/or broadcast channel transmission.

Optionally, the time resource available to the random access preamble includes a part or all of a time resource other than a reserved time resource in the flexible time resource.

Optionally, a configuration granularity of the time resource available to the random access preamble is a slot, the time resource available to the random access preamble includes the flexible time resource, and the flexible time resource is a slot.

The processing unit is further configured to control the communications unit to:

receive slot format information for the flexible time resource, and determine that the slot format information is invalid.

Optionally, a configuration granularity of the time resource available to the random access preamble is a symbol, the time resource available to the random access preamble includes the flexible time resource, and the flexible time resource is a symbol.

The processing unit is further configured to control the communications unit to:

receive slot format information of a slot in which the flexible time resource is located, and determine, based on the slot format information, a transmission direction of a time resource other than the flexible time resource in the slot in which the flexible time resource is located.

In another implementation, the processing unit is configured to control the communications unit to:

receive higher layer signaling from a base station, where the higher layer signaling is used to indicate a periodicity, and configures a fixed uplink time resource, a fixed downlink time resource, and a flexible time resource;

receive a broadcast message from the base station, where the broadcast message is used to indicate a random access configuration, the random access configuration includes a format of a random access preamble and a time resource available to the random access preamble, the time resource available to the random access preamble includes a part or all of the fixed uplink time resource, and a length of a time resource that is used by the random access preamble and that is indicated by the format is greater than a length of the time resource available to the random access preamble; and send the random access preamble to the base station based on the random access configuration.

A time resource actually used by the random access preamble includes: the time resource available to the random access preamble, and a part or all of at least one of the fixed downlink time resource and the flexible time resource.

Optionally, the time resource actually used by the random access preamble includes a part or all of a time resource, in the fixed downlink time resource, other than a fixed downlink time resource used for synchronization channel and/or broadcast channel transmission.

Optionally, the time resource actually used by the random access preamble includes a part or all of a time resource other than a reserved time resource in the flexible time resource.

Optionally, a configuration granularity of the time resource actually used by the random access preamble is a slot, the time resource actually used by the random access preamble includes the flexible time resource, and the flexible time resource is a slot.

The processing unit is further configured to control the communications unit to:

receive slot format information for the flexible time resource, and determine that the slot format information is invalid.

Optionally, a configuration granularity of the time resource available to the random access preamble is a symbol, the time resource available to the random access preamble includes the flexible time resource, and the flexible time resource is a symbol.

The processing unit is further configured to control the communications unit to:

receive slot format information of a slot in which the flexible time resource is located, and determine, based on the slot format information, a transmission direction of a time resource other than the flexible time resource in the slot in which the flexible time resource is located.

It should be understood that, the terminal or the chip of the terminal may be configured to implement the steps performed by the terminal in the wireless communication method in the embodiments of the present application. For related features, refer to the foregoing description. Details are not described herein again.

It should be understood that, the terminal or the chip of the terminal may be configured to implement the steps performed by the terminal in the wireless communication method in the embodiments of the present application. For related features, refer to the foregoing description. Details are not described herein again.

All or some of the foregoing embodiments may be implemented via software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, all or some of the procedures or functions according to the embodiments of the present application are generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

Although the present application is described with reference to the embodiments, in a process of implementing the present application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a case of a plurality of. A single processor or another unit may implement several functions enumerated in the claims. Some measures are recorded in dependent claims that are different from each other, but this does not mean that these measures cannot be combined to produce a better effect.

A person skilled in the art should understand that the embodiments of this application may be provided as a method, an apparatus (device), a computer readable storage medium, or a computer program product. Therefore, this application may use a form of hardware only embodiments, software only embodiments, or embodiments with a combination of software and hardware. They are collectively referred to as "modules" or "systems".

A person skilled in the art may further understand that various illustrative logical blocks and steps that are listed in the embodiments of this application may be implemented via electronic hardware, computer software, or a combination thereof. Whether the functions are implemented via hardware or software depends on particular applications and a design requirement of the entire system. A person of ordinary skill in the art may use various methods to implement the described functions for each particular application, but it should not be considered that the implementation goes beyond the scope of the embodiments of this application.

The various illustrative logical units and circuits described in the embodiments of this application may implement or operate the described functions via a general processor, a digital signal processor, an application-specific integrated circuit (ASIC), a field programmable gate array (FPGA) or another programmable logical apparatus, a discrete gate or transistor logic, a discrete hardware component, or a design of any combination thereof. The general processor may be a microprocessor. Optionally, the general processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in the embodiments of this application may be directly embedded into hardware, a software unit executed by a processor, or a combination thereof. The software module may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processor so that the processor may read information from the storage medium and write information to the storage medium. Alternatively, the storage medium may further be integrated into a processor. The processor and the storage medium may be arranged in an ASIC, and the ASIC may be arranged in a terminal device. Alternatively, the processor and the storage medium may also be arranged in different components of the terminal device.

In one or more example designs, the functions described in the embodiments of this application may be implemented via hardware, software, firmware, or any combination thereof. If the present application is implemented by software, these functions may be stored in a computer-readable medium or are transmitted to the computer-readable medium in a form of one or more instructions or code. The computer-readable medium is either a computer storage medium or a communications medium that enables a computer program to move from one place to another. The storage medium may be an available medium that may be accessed by any general or special computer. For example, such a computer-readable medium may include but is not limited to a RAM, a ROM, an EEPROM, a CD-ROM, or another optical disc storage, a disk storage or another magnetic storage apparatus, or any other medium that may be used to bear or store program code, where the program code is in a form of an instruction or a data structure or in a form that can be read by a general or special computer or a general or special processor. In addition, any connection may be appropriately defined as a computer-readable medium. For example, if software is transmitted from a website, a server, or another remote resource via a coaxial cable, an optical fiber, a twisted pair, a digital subscriber line (DSL) or in a wireless manner, such as infrared, radio, or microwave, the software is included in a defined computer-readable medium. The disc and the disk include a compressed disk, a laser disk, an optical disc, a DVD, a floppy disk, and a Blu-ray disc. The disk generally copies data by a magnetic means, and the disc generally copies data optically by a laser means. The foregoing combination may also be included in the computer-readable medium.

This application is described with reference to the flowcharts and/or block diagrams of the method, the apparatus (device), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the present application is described with reference to specific features and the embodiments thereof, obviously, various modifications and combinations may be made to them without departing from the spirit and scope of the present application. Correspondingly, the specification and accompanying drawings are merely example description of the present application defined by the accompanying claims, and is considered as any of or all modifications, variations, combinations or equivalents that cover the scope of the present application. Obviously, a person skilled in the art can make various modifications and variations to the present application without departing from the spirit and scope of the present application. The present application is intended to cover these modifications and variations provided that they fall within the scope of protection defined by the following claims and their equivalent technologies.

What is claimed is:

1. A wireless communication method performed by a terminal or a chip configured to operate in a terminal, the method comprising:
receiving higher layer signaling from a base station, wherein the higher layer signaling:
indicates a periodicity, and
configures, in the periodicity, a fixed uplink time resource, a fixed downlink time resource, and a flexible time resource;
receiving a broadcast message from the base station, wherein the broadcast message indicates a random access configuration, and wherein the random access configuration comprises a time resource available to a random access preamble; and
sending the random access preamble to the base station based on the random access configuration,
wherein the time resource available to the random access preamble comprises at least a part of the flexible time resource, and
wherein the time resource available to the random access preamble further comprises at least a part of the fixed uplink time resource.

2. The method according to claim 1, wherein the random access configuration further comprises a format of the random access preamble,
wherein a length of a time resource that is used by the random access preamble and that is indicated by the format is less than or equal to a length of the time resource available to the random access preamble.

3. The method according to claim 1, wherein the time resource available to the random access preamble comprises at least a part of a time resource other than a reserved time resource in the flexible time resource.

4. The method according to claim 1, wherein a configuration granularity of the time resource available to the random access preamble is a slot,
wherein the time resource available to the random access preamble comprises the flexible time resource,
wherein the flexible time resource is a slot; and
wherein the method further comprises:
receiving a slot format information for the flexible time resource, and
determining that the slot format information is invalid.

5. The method according to claim 1, wherein a configuration granularity of the time resource available to the random access preamble is a symbol,
wherein the time resource available to the random access preamble comprises the flexible time resource,
wherein the flexible time resource is a symbol; and
wherein the method further comprises:
receiving a slot format information of a slot in which the flexible time resource is located, and
determining, based on the slot format information, a transmission direction of a time resource other than the flexible time resource in the slot in which the flexible time resource is located.

6. A wireless communication method performed by a base station or a chip configured to operate in a base station, the method comprising:
sending higher layer signaling to a terminal, wherein the higher layer signaling:
indicates a periodicity, and
configures, in the periodicity, a fixed uplink time resource, a fixed downlink time resource, and a flexible time resource;
sending a broadcast message to the terminal, wherein the broadcast message indicates a random access configuration, and wherein the random access configuration comprises a time resource available to a random access preamble; and
receiving a random access preamble from the terminal based on the random access configuration,
wherein the time resource available to the random access preamble comprises at least a part of the flexible time resource, and
wherein the time resource available to the random access preamble further comprises at least a part of the fixed uplink time resource.

7. The method according to claim 6, wherein the random access configuration further comprises a format of the random access preamble,
wherein a length of a time resource that is used by the random access preamble and that is indicated by the format is less than or equal to a length of the time resource available to the random access preamble.

8. The method according to claim 6, wherein the time resource available to the random access preamble comprises at least a part of a time resource other than a reserved time resource in the flexible time resource.

9. An apparatus, comprising:
at least one processor, and
a memory storing instructions that are executed by the at least one processor to carry out a method comprising:
receiving higher layer signaling from a base station, wherein the higher layer signaling:
indicates a periodicity, and
configures, in the periodicity, a fixed uplink time resource, a fixed downlink time resource, and a flexible time resource;
receiving a broadcast message from the base station, wherein the broadcast message indicates a random access configuration, and wherein the random access configuration comprises a time resource available to a random access preamble; and
sending the random access preamble to the base station based on the random access configuration,
wherein the time resource available to the random access preamble comprises at least a part of the flexible time resource, and
wherein the time resource available to the random access preamble further comprises at least a part of the fixed uplink time resource.

10. The apparatus according to claim 9, wherein the random access configuration further comprises a format of the random access preamble,
wherein a length of a time resource that is used by the random access preamble and that is indicated by the format is less than or equal to a length of the time resource available to the random access preamble.

11. The apparatus according to claim 9, wherein the time resource available to the random access preamble comprises at least a part of a time resource other than a reserved time resource in the flexible time resource.

12. The apparatus according to claim 9, wherein a configuration granularity of the time resource available to the random access preamble is a slot,
wherein the time resource available to the random access preamble comprises the flexible time resource,
wherein the flexible time resource is a slot; and wherein the method further comprises:
receiving a slot format information for the flexible time resource; and
determining that the slot format information is invalid.

13. The apparatus according to claim 9, wherein a configuration granularity of the time resource available to the random access preamble is a symbol,
wherein the time resource available to the random access preamble comprises the flexible time resource,
wherein the flexible time resource is a symbol; and
wherein the method further comprises:
receiving a slot format information of a slot in which the flexible time resource is located, and
determining, based on the slot format information, a transmission direction of a time resource other than the flexible time resource in the slot in which the flexible time resource is located.

14. An apparatus, comprising:
at least one processor, and
a memory storing instructions that are executed by the at least one processor to carry out a method comprising:
sending higher layer signaling to a terminal, wherein the higher layer signaling:
indicates a periodicity, and
configures, in the periodicity, a fixed uplink time resource, a fixed downlink time resource, and a flexible time resource;
sending a broadcast message to the terminal, wherein the broadcast message indicates a random access configuration, and wherein the random access configuration comprises a time resource available to a random access preamble; and
receive a random access preamble from the terminal based on the random access configuration, wherein
the time resource available to the random access preamble comprises at least a part of the flexible time resource, and
wherein the time resource available to the random access preamble further comprises at least a part of the fixed uplink time resource.

15. The apparatus according to claim 14, wherein the random access configuration further comprises a format of the random access preamble,
wherein a length of a time resource that is used by the random access preamble and that is indicated by the format is less than or equal to a length of the time resource available to the random access preamble.

16. The apparatus according to claim 14, wherein the time resource available to the random access preamble comprises at least a part of a time resource other than a reserved time resource in the flexible time resource.

* * * * *